(12) United States Patent
Kano et al.

(10) Patent No.: US 9,705,791 B2
(45) Date of Patent: Jul. 11, 2017

(54) ROUTE SETTING DEVICE AND ROUTE SETTING METHOD

(71) Applicant: FUJITSU LIMITED, Kawasaki-shi, Kanagawa (JP)

(72) Inventors: Shinya Kano, Inagi (JP); Koji Tsubouchi, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 284 days.

(21) Appl. No.: 14/678,634

(22) Filed: Apr. 3, 2015

(65) Prior Publication Data

US 2015/0350064 A1    Dec. 3, 2015

(30) Foreign Application Priority Data

Jun. 3, 2014  (JP) ................................. 2014-114818

(51) Int. Cl.
*H04L 12/741* (2013.01)
*H04L 12/751* (2013.01)

(52) U.S. Cl.
CPC .............. *H04L 45/54* (2013.01); *H04L 45/02* (2013.01)

(58) Field of Classification Search
None
See application file for complete search history.

(56) References Cited

U.S. PATENT DOCUMENTS

| | | | | |
|---|---|---|---|---|
| 7,899,929 | B1 * | 3/2011 | Beser ...................... | H04L 45/60 370/235 |
| 8,867,341 | B2 * | 10/2014 | Shao ................... | H04L 67/2895 370/229 |
| 2015/0372911 | A1 * | 12/2015 | Yabusaki ................ | H04L 67/34 709/226 |

FOREIGN PATENT DOCUMENTS

JP           2001-352337 A     12/2001

\* cited by examiner

*Primary Examiner* — Hong Cho
(74) *Attorney, Agent, or Firm* — Arent Fox LLP

(57) ABSTRACT

A route setting device includes: a storage in which routing information is stored; and a processor configured to execute a procedure, the procedure including: selecting a network device among a plurality of network devices forming a network over which a signal including transmission source information and destination information is transmitted, the network device changing at least one of the transmission source information and the destination information included in the signal; categorizing the network device based on a type of the changed information; and generating the routing information according to a result of the categorizing, wherein the route setting device sets the generated routing information to the network device.

12 Claims, 21 Drawing Sheets

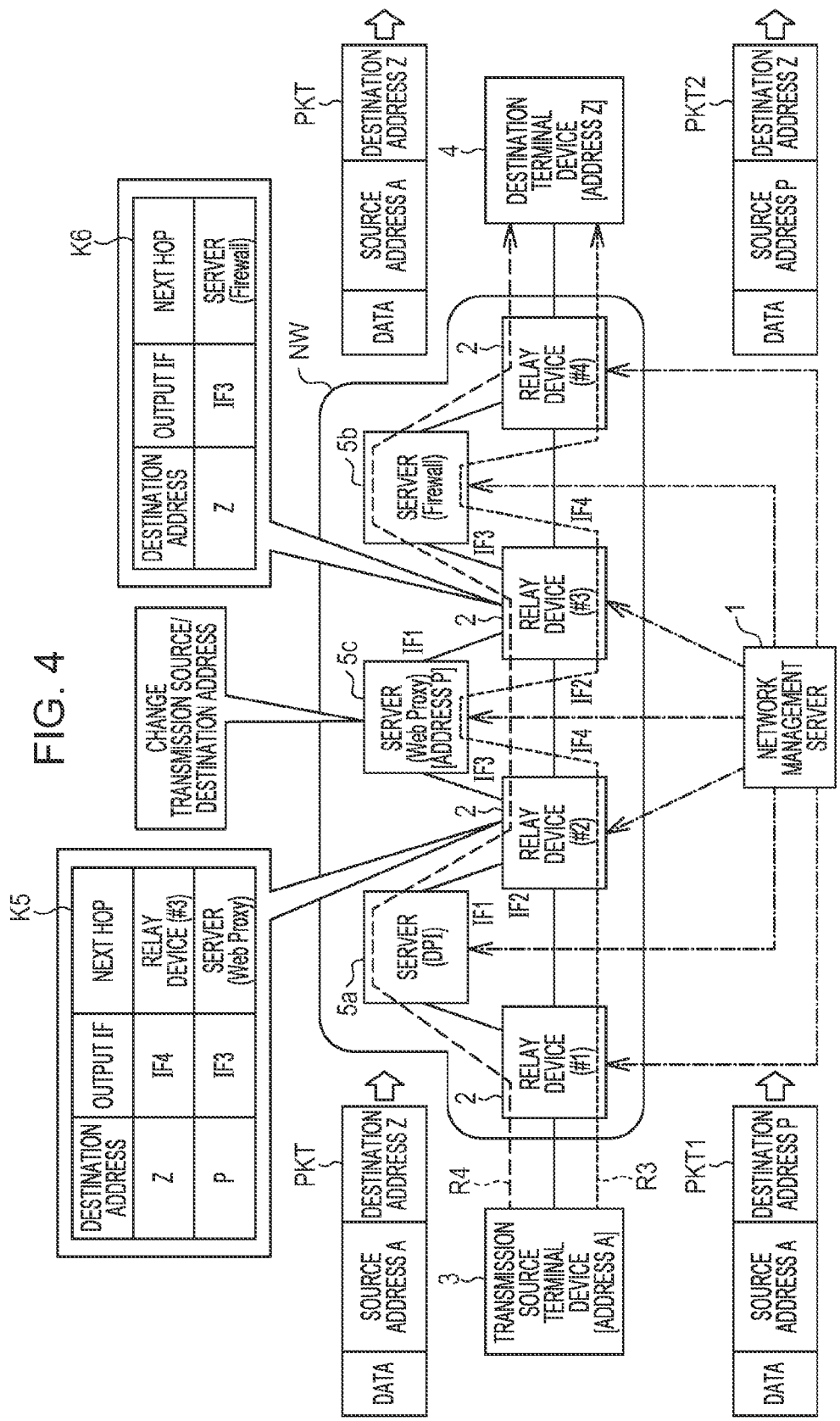

Type-1
(SOURCE ADDRESS: TRANSPARENT, DESTINATION ADDRESS: TRANSPARENT)

Type-2
(SOURCE ADDRESS: CHANGED, DESTINATION ADDRESS: TRANSPARENT)

Type-3
(SOURCE ADDRESS: TRANSPARENT, DESTINATION ADDRESS: CHANGED)

Type-4
(SOURCE ADDRESS: CHANGED, DESTINATION ADDRESS: CHANGED)

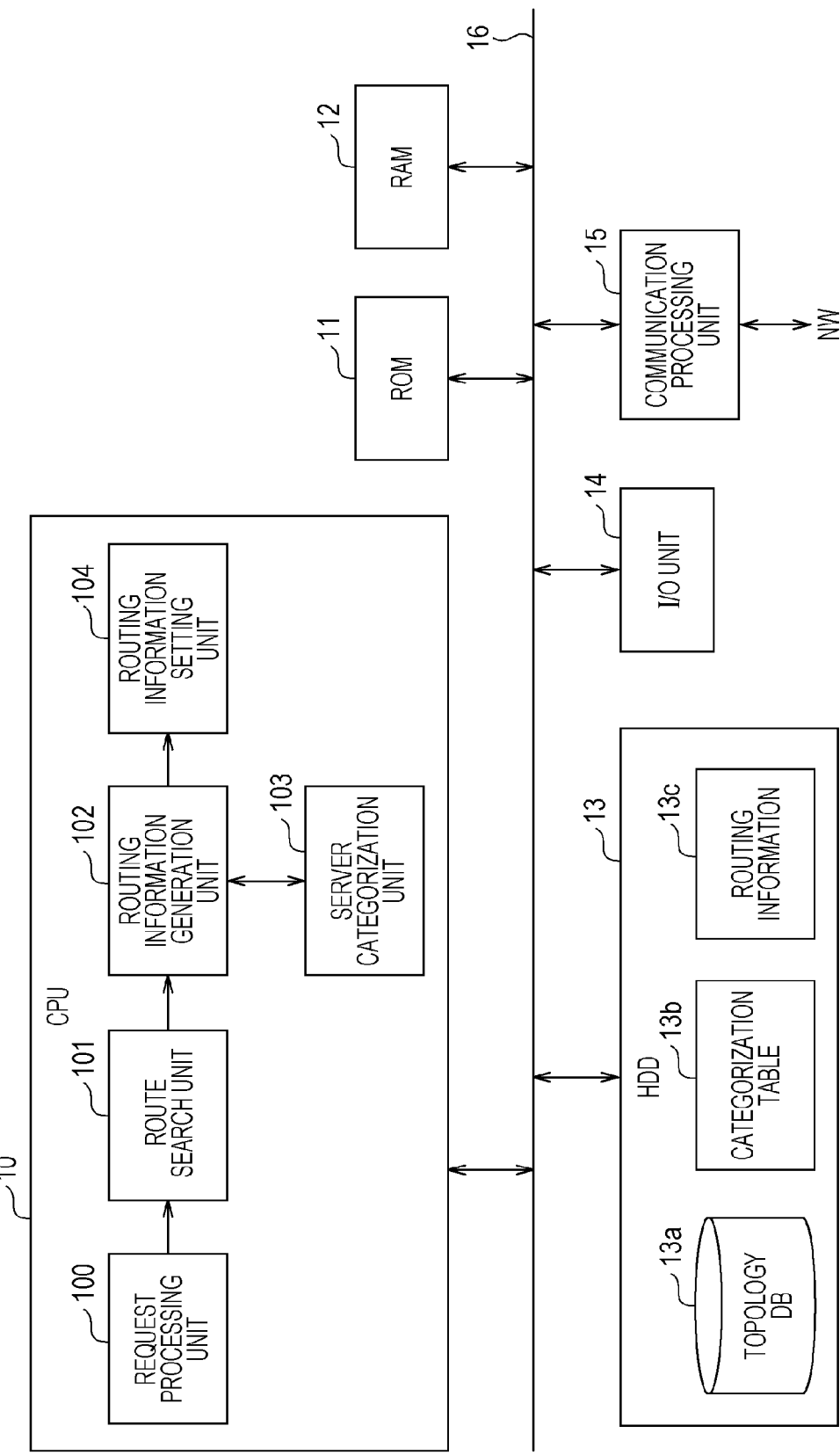

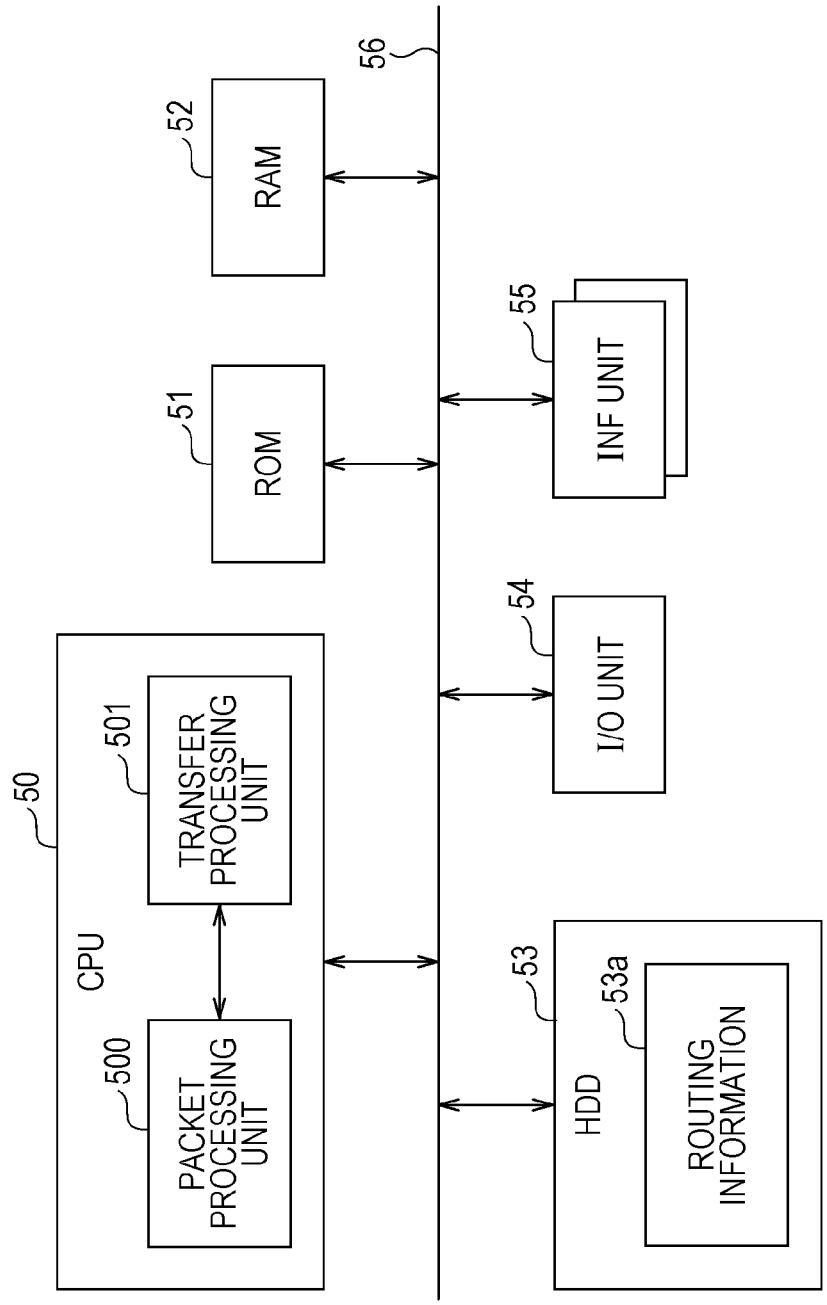

ROUTE SETTING DEVICE AND ROUTE SETTING METHOD

CROSS-REFERENCE TO RELATED APPLICATION

This application is based upon and claims the benefit of priority of the prior Japanese Patent Application No. 2014-114818, filed on Jun. 3, 2014, the entire contents of which are incorporated herein by reference.

FIELD

The embodiments discussed herein are related to a route setting device and a route setting method.

BACKGROUND

With an increase in communication demand, the number of network devices that are connected to one network is increased, and a network configuration is complicated. For example, because each router within the network individually controls a route over which a packet is transferred, a packet route is difficult to flexibly configure over the network as a whole.

In contrast, in a network to which a software defined network technology (SDN) is applied, because a function of controlling each network devices is integrated into one piece of software, it is possible to flexibly configure a route. For example, in an open flow network (OFN), a function of controlling a packet route is separated from a relay device for the packet, and is integrated into a single network management server. It is possible for the network management server to flexibly configure the packet route over the whole network by setting the routing information indicating the transmission source of the packet to each relay device.

The network management server can set the routing information to a server equipped with various functions as well as the relay device within the network. The routing information, for example, is generated based on a destination address or a source address within a header of the packet.

For example, with regard to transfer of the packet, Japanese Laid-open Patent Publication No. 2001-352337 discloses that when the packet is relayed over different domains, the source address or the destination address of the packet is changed.

SUMMARY

According to an aspect of the invention, a route setting device includes: a storage in which routing information is stored; and a processor configured to execute a procedure, the procedure including: selecting a network device among a plurality of network devices forming a network over which a signal including transmission source information and destination information is transmitted, the network device changing at least one of the transmission source information and the destination information included in the signal; categorizing the network device based on a type of the changed information; and generating the routing information according to a result of the categorizing, wherein the route setting device sets the generated routing information to the network device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating one example of routing information that is set to in the relay devices;

FIG. 6 is a configuration diagram illustrating one example of a network management server;

FIG. 7 is a configuration diagram illustrating one example of the servers within the network;

DESCRIPTION OF EMBODIMENTS

In a case where, for example, like a proxy server, a server that changes a destination address and/or source address of a packet that passes through the server is included in a network, the changed destination address and/or source address is not consistent with routing information of a network device on a route for the packet. In this case, the packet is not normally transferred over a given route and does not reach a desired destination terminal device.

A technology that sets suitable routing information to a network device on a signal route is described.

Figure 1:
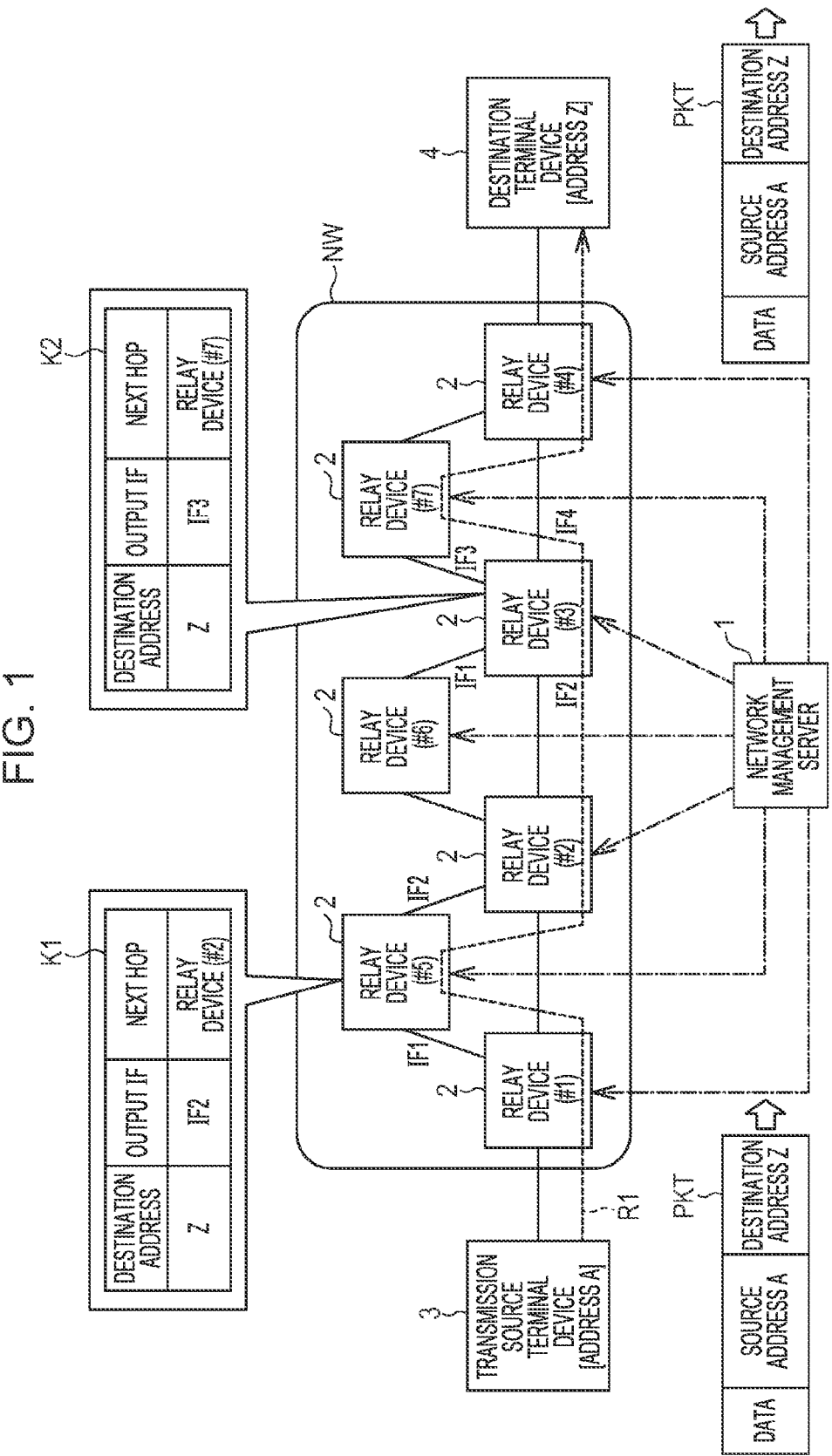
FIG. 1 is a configuration diagram illustrating one example of a network including relay devices.

FIG. 1 is a configuration diagram illustrating one example of a network including relay devices. A network NW includes multiple relay devices (#1 to #7) 2 that transfer a packet PKT as a signal. As the relay devices (#1 to #7) 2, routers are given as examples, but are not limited to these. For example, layer 2 switches may be instead used.

The relay devices 2 includes interfaces IFn (n: 1 to 4) in all paths corresponding to transfer destinations. The relay devices 2 are connected to other devices through the interfaces IFn.

In the present example, the relay devices (#1 to #4) 2 are connected in series to one another. The relay device (#5) 2 is connected to the relay device (#1) 2 and the relay device (#2) 2, and the relay device (#6) 2 is connected to the relay device (#2) 2 and the relay device (#3) 2. The relay device (#7) 2 is connected to the relay device (#3) 2 and the relay device (#4) 2. Furthermore, the relay device (#1) 2 and the relay device (#4) 2 are connected to a transmission source terminal device 3 and a destination terminal device 4, respectively.

The transmission source terminal device 3 transmits a packet to the destination terminal device 4 through the network NW. That is, the transmission source terminal device 3 is a transmission source of the packet PKT, and the destination terminal device 4 is a destination of the packet PKT. As the transmission source terminal device 3 and the destination terminal device 4, a personal computer and a smartphone are given as examples, but are not limited to these.

A header that is control information, and data are included in the packet PKT. A destination address (destination information) and a source address (transmission source information) are included in the header. The destination address and the source address indicate a destination and transmission source of a packet, respectively. When addresses of the transmission source terminal device 3 and the destination terminal device 4 are set to be "A" and "Z", respectively, a destination address and a source address within the packet PKT indicate "A" and "Z", respectively. Moreover, the present example of a signal that is transferred to the network NW is a packet, but the signal is not limited to this.

A network management server 1 as a route setting device sets packet routing information to each relay device 2 within the network NW, which is network device, based on the SDN technology, for example. The routing information indicates the destination to which the relay devices 2 transfer the packet PKT, based on at least one of the destination address and source address of the packet PKT. The network management server 1 configures a route R1 for the packet PKT within the network NW, which, in some cases, is called a service chain, by setting the routing information. The packet PKT that is transferred along the route R1 passes through the relay devices (#1, #5, #2, #3, #7, and #4) 2 in this sequence.

In FIG. 1, as one example, routing information K1 that is set to the relay device (#5) 2 and routing information K2 that is set to the relay device (#3) 2 are illustrated. The routing information K1 and the routing information K2 each include a "destination address", an "output interface (IF)", a "NEXT HOP".

The "destination address" indicates a destination address of the transfer target packet PKT. The "output interface" indicates an interface that outputs the packet PKT. The "NEXT HOP" indicates the transfer destination of the packet PKT on the route R1. Moreover, in FIG. 1, the "NEXT HOP" may be expressed as a device name, but, for example, may be expressed as an Internet Protocol (IP) of the relay device 2.

For example, the "destination address", the "output interface", and the "NEXT HOP" in the routing information K1 for the relay device (#5) 2 indicate "Z", "IF2", and the "relay device (#2)", respectively. For this reason, the relay device (#5) 2 transfers the packet PKT of which the destination address is "Z" to the relay device (#2) 2 through an interface IF2.

Furthermore, the "destination address", the "output interface", and the "NEXT HOP" in the routing information K2 for the relay device (#3) 2 indicate "Z", "IF3", and "relay device (#7)", respectively. For this reason, the relay device (#3) 2 transfers the packet PKT of which the destination address is "Z" to the relay device (#7) 2 through an interface IF3. Moreover, in the same manner, the routing information in which the "destination address" indicates "Z" is also set to the other relay devices 2.

In this manner, the network management server 1 sets the routing information that is based on the destination address "Z" that is common to the relay devices 2 on the route R1. Accordingly, the packet PKT is transferred from the transmission source terminal device 3 to the destination terminal device 4 along the route R1. Therefore, the network management server 1 can flexibly configure the route R1 for the packet PKT over the entire network NW with the SDN technology.

Figure 2:
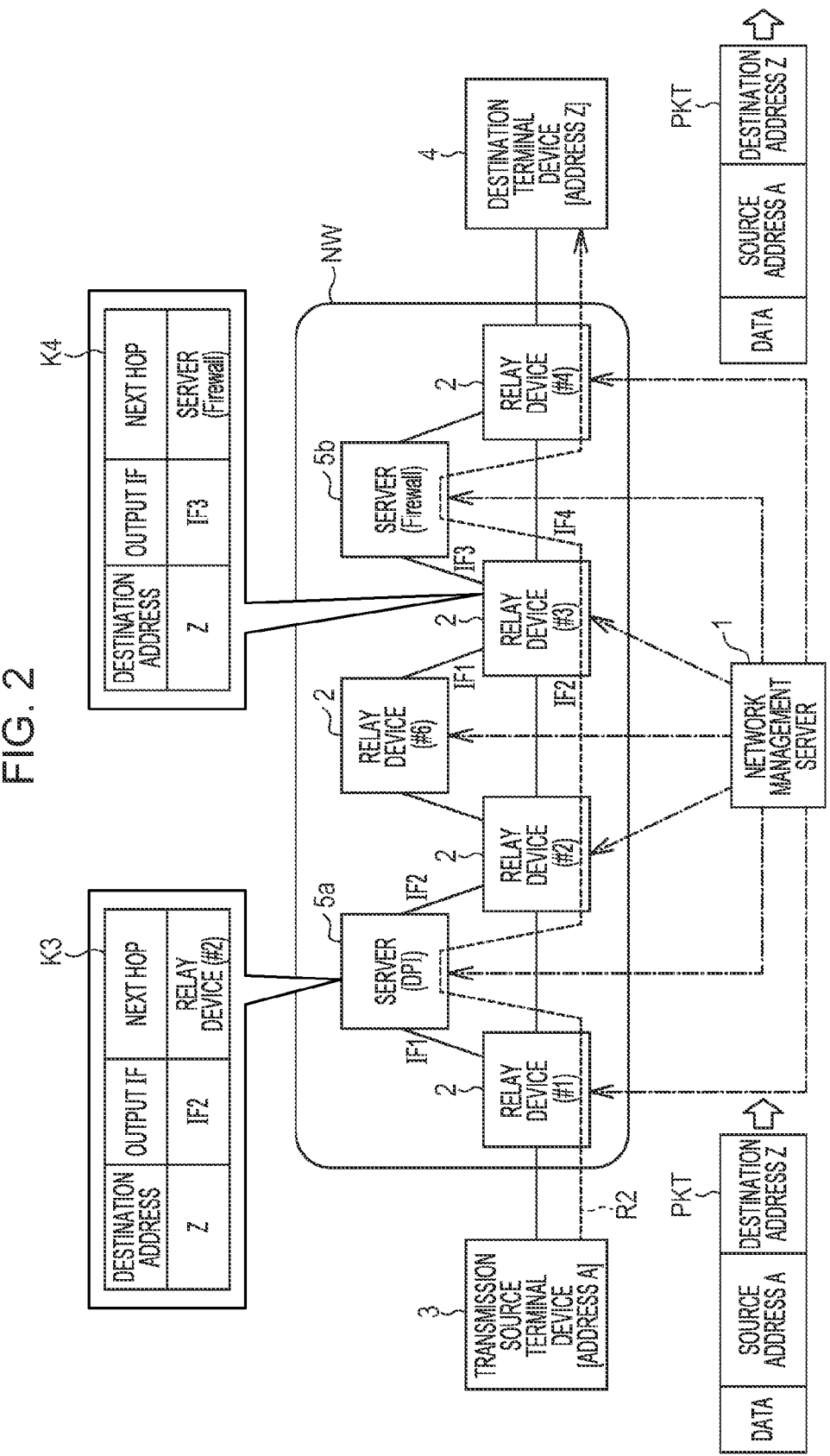
FIG. 2 is a configuration diagram illustrating one example of a network including the relay devices and servers.

The network management server 1 can set the routing information to a server equipped with various functions, as well as the relay devices 2. In FIG. 2, one example of the network NW including the relay devices 2 and servers 5a and 5b. In FIG. 2, constituent elements that are the same as those illustrated in FIG. 1 are given the same reference numerals and descriptions of them are omitted.

On the network NW in the present example, instead of the relay device (#5) 2 of FIG. 1, the server 5a equipped with a deep packet inspection (DPI) function is installed, and instead of the relay device (#7) 2 in FIG. 1, the server 5b equipped with a firewall function is installed. The server 5a monitors and analyzes the packet that is transferred over the network NW, specifies a terminal device that is the transmission source or a terminal device that is the transmission destination, specifies an application in which the packet is used, and so on. Furthermore, the server 5b monitors packets that pass through the server 5b, blocks a specific packet or allows a specific packet to pass through. The servers 5a and 5b transfer the packet PKT through an interface IFm (m: 1, 2) for every path.

The network management server 1 sets the routing information to the relay devices (#1 to #4, and #6) 2 and in the servers (the network device) 5a and 5b. Accordingly, the packet PKT is transferred from the transmission source terminal device 3 to the destination terminal device 4 along a route R2. The packet PKT that is transferred over the route 2 passes through the relay device (#1) 2, the server 5a, the relay devices (#2, and #3) 2, the server 5b, and the relay device (#4) 2, in this sequence.

In FIG. 2, as one example, routing information K3 that is set to in the server 5a and routing information K4 that is set to the relay device (#3) 2 are illustrated.

The "destination address" the "output interface", and the "NEXT HOP" in the routing information K3 for the server 5a indicate "Z", "IF2", and "the relay device (#2)". For this reason, the server 5a transfers the packet PKT of which the destination address is "Z" to the relay device (#2) 2 through the interface IF2.

Furthermore, the "destination address", the "output interface", and the "NEXT HOP" in the routing information K4 for the relay device (#3) 2 indicate "Z", "IF3", and "server (firewall)", respectively. For this reason, the relay device (#3) 2 transfers the packet PKT of which the destination address is "Z" to the server 5b through the interface IF3. Moreover, in the same manner, the routing information in which the "destination address" is "Z" is set to the other relay devices 2 and in the server 5b.

The servers 5a and 5b do not change the destination address and source address of the packet PKT. For this reason, even though the routing information is set to the relay devices 2 and in the servers 5a and 5b within the network NW based on the common destination address "Z", the network management server 1 normally transfers the packet PKT along the route R2.

However, in a case where, for example, like the proxy server, the server that changes the destination address or the source address of the packet PKT that passes through the server is included in the network NW, the changed destination address and/or source address is not consistent with the routing information of each device on the route for the packet PKT. In this case, the packet PKT is not normally transferred along a given route and does not reach the destination terminal device 4.

Figure 3:
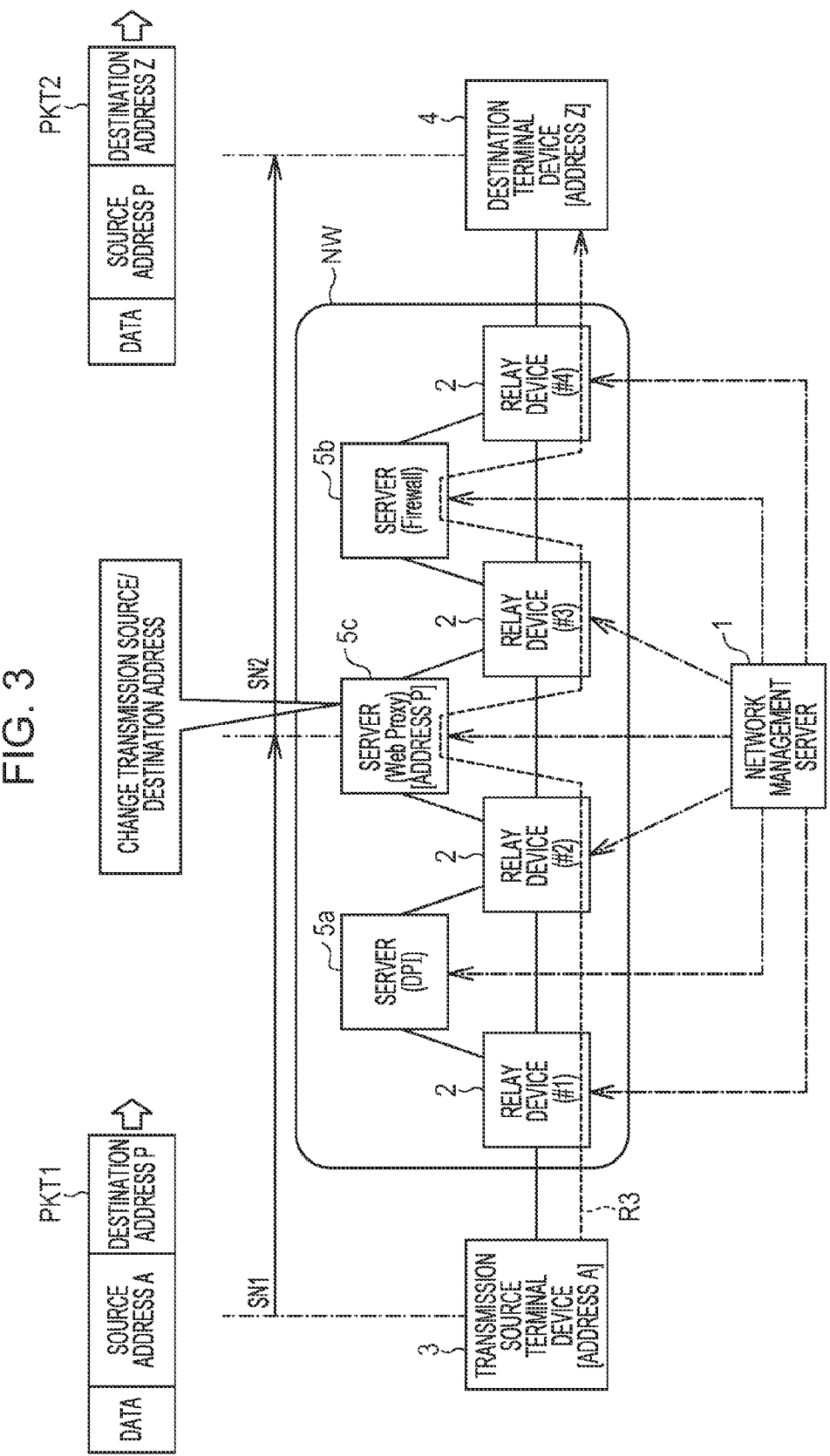
FIG. 3 is a configuration diagram illustrating another example of the network including the relay devices and the servers.

FIG. 3 is a configuration diagram illustrating another example of the network NW including the relay devices 2 and the servers 5a to 5c. In FIG. 3, constituent elements that are the same as those illustrated in FIGS. 1 and 2 are given the same reference numerals and descriptions of them are omitted.

On the network NW in the present example, instead of the relay device (#6) 2 of FIG. 2, a server 5c equipped with a Web proxy function is installed. Instead of the terminal device, the server 5c has access to a Web server for the terminal device.

For this reason, based on a Transmission Control Protocol (TCP), the server 5c establishes communication sessions SN1 between the transmission source terminal device 3 and the server 5c and SN2 between the destination terminal device 4 and the server 5c. Therefore, the server 5c transfers the packet received from the communication SN1 with the transmission source terminal device 3 to the communication session SN2 with the destination terminal device 4.

At this point, a route from the transmission source terminal device 3, through the relay devices (#1 and #2) 2, the server 5c, the relay device (#3) 2, the server 5b, and the relay device (#4) 2, to the destination terminal device 4, in this sequence are assumed to be a route R3. In this case, a packet PKT 1 that is transferred from the transmission source terminal device 3 to the server 5c, a packet PKT 2 that is transferred from the server 5c to the destination terminal device 4 are different in the destination address and the source address from each other.

In order to be based on the communication session SN1, the packet PKT 1 includes the destination address indicating an address "P" of the server 5c and the source address indicating an address "A" of the transmission source terminal device 3. On the other hand, in order to be based on the communication session SN2, the packet PKT 2 includes the destination address indicating an address "Z" of the destination address terminal device 4 and the source address indicating an address "P" of the server 5c.

For this reason, the server 5c associates the communication sessions SN1 and SN2 with each other, and the packet PKT 1 in the communication session SN1 into the packet PKT 2 in the communication session SN2. That is, the server 5c changes the destination address of the packet PKT 1 from "P" to "Z", and changes the source address of the packet PKT 1 from "A" to "P".

Therefore, even though, as in the examples in FIGS. 1 and 2, the network management server 1 sets the routing information, which is based on the common destination address "Z", to the relay devices (#1 to #4) 2 and the servers 5c and 5b on the route R3, the packets PKT 1 and PKT 2 are not normally transferred.

Then, the network management server 1 detects the server on the route, which changes the destination address and/or source address of the packet that passes through the server, and categories the detected packets by types of information (the destination address and the source address) that are changed. The network management server 1 sets a suitable route by generating the routing information of each device within the network according to a result of the categorization by the server.

In FIG. 4, one example of routing information K5 and routing information K6 that are set to the relay devices (#2 and #3) 2 on the network NW in FIG. 3 is illustrated. In FIG. 4, constituent elements that are the same as those illustrated in FIGS. 1 to 3 are given the same reference numerals and descriptions of them are omitted.

On the network NW in the present example, in addition to the route R3 on which the server 5c is present, which is described above, a route R4 on which the server 5c is not present is set. The packet PKT that is transferred over the route R4 from the transmission source terminal device 3 to the destination terminal device 4 passes through the relay device (#1) 2, the server 5a, the relay devices (#2, and #3) 2, the server 5b, and the relay device (#4) 2, in this sequence.

Because the packet PKT that is transferred over the route R4 does not pass through the server 5c, a destination address "Z" and a source address "A" thereof are not changed. On the other hand, because the packet PKT 1 that is transferred over the route R3 passes through the server 5c, as described above, a destination address "P" and the source address "A" are changed to the destination address "Z" and the source address "P", respectively.

Therefore, the network management server 1 sets an individual routing information K5 for the packet PKT 1 and the packet PKT on the routes R3 and R4, respectively, to the relay device (#2) 2 that is a node adjacent to the server 5c.

The "destination address", the "output interface", and the "NEXT HOP" in the routing information K5 for the packet PKT on the route R4 indicate "Z", "IF4", and the "relay device (#3)", respectively. For this reason, the relay device (#2) 2 transfers the packet PKT of which the destination address is "Z" to the relay device (#3) 2 through an interface IF4.

Furthermore, the "destination address", the "output interface", and the "NEXT HOP" in the routing information K5 for the packet PKT 1 on the route R3 indicate "P", "IF3", and the "server (Web proxy)", respectively. For this reason, the relay device (#2) 2 transfers the packet PKT 1 of which the destination address is "P", as the packet PKT 2, to the server 5c through the interface IF3.

On the other hand, the relay device (#3) 2 transfers the packet PKT of which the destination address is "Z", and the packet PKT 2, to the server 5b through the interface IF3. For this reason, the "destination address", the "output interface", and the "NEXT HOP" in routing information K6 for the relay device (#3) 2 indicate "Z", "IF3", and "server (firewall)", respectively.

Because the suitable routing information is set in this manner, the network management server 1 searches a route between the transmission source terminal device 3 and the destination terminal device 4, then detects the servers 5a to 5c on the route, and categories the servers 5a to 5c into four types as one example. In FIGS. 5A to 5D, categorization of the servers is illustrated.

According to the present embodiment, the network management server 1 categorizes the servers 5 within the network NW into Type-1 to Type-4. The server 5 has a reception-side interface IFa that receives a packet PKTin from a different device, and a transmission-side interface IFb that transmits to a packet PKTout to the different device. The reception-side interface IFa and the transmission-side interface IFb have individual addresses "Pa" and "Pb", respectively.

Figure 5A:
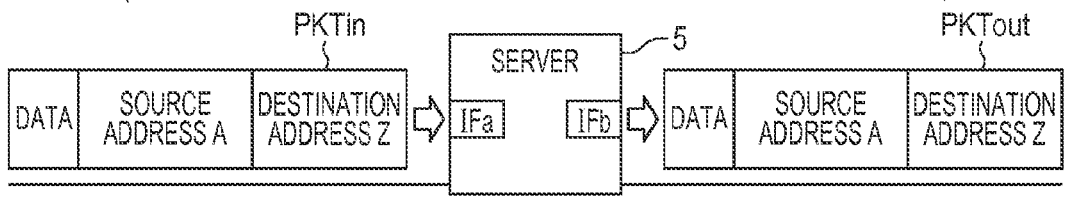
FIGS. 5A to 5D are diagrams illustrating categorization of the servers.

In FIG. 5A, a Type-1 server 5 is illustrated. The Type-1 server 5 transmits the packet PKTin without making any change of the destination address and source address of the packet PKTin. For example, the Type-1 server 5 receives the packet PKTin of which the destination address is "Z" and of which the source address is "A" through the reception-side interface IFa, and transmits the received packet PKTin as it, as the packet PKTout, from the transmission-side interface IFb.

As the Type-1 server 5, in addition to the firewall and the DPI, which are described above, a server equipped with an instruction detection system (IDS) function is given as an example. The IDS has a function of monitoring the packet that is transferred over the network and detecting a wrongful motion.

Figure 5B:
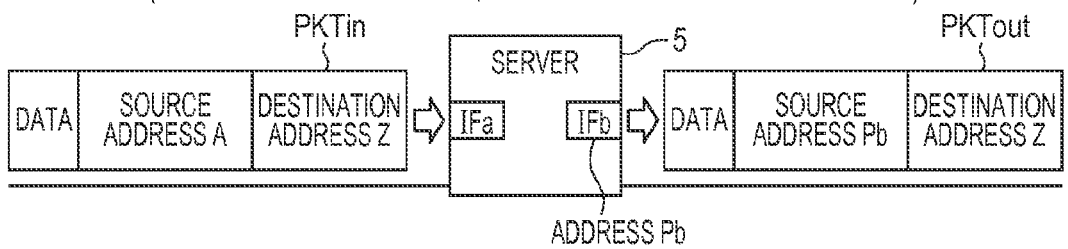

In FIG. 5B, a Type-2 server 5 (first category) is illustrated. The Type-2 server 5 transmits the packet PKTin of which the source address is changed and the destination address is not changed. For example, the Type-2 server 5 receives the packet PKTin of which the destination address is "Z" and of which the source address is "A" through the reception-side interface IFa, converts the received packet PKTin into the packet PKTout of which the destination address is "Z" and of which the source address is "Pb", and transmits the resulting packet PKTout from the transmission-side interface IFb.

As the Type-2 server 5, a server equipped with a transparent proxy function, a transparent cache function, a Source based Network Address Translation (SNAT) function, and a Source based Network Address Port Translation (SNAPT) function is given as an example. The cache (web cache) has a function in which, in a case where the proxy function is performed, Web data is temporarily stored (cached), and when the terminal device attempts access again, the stored web data to the terminal device. The SNAT has a function of converting an IP address of a transmission source of a transfer target packet into a designated IP address (for example, an IP address of the transmission-side interface IFb). The SNAP has a function of converting a port number of the transmission source of the packet in addition to converting the address.

Figure 5C:
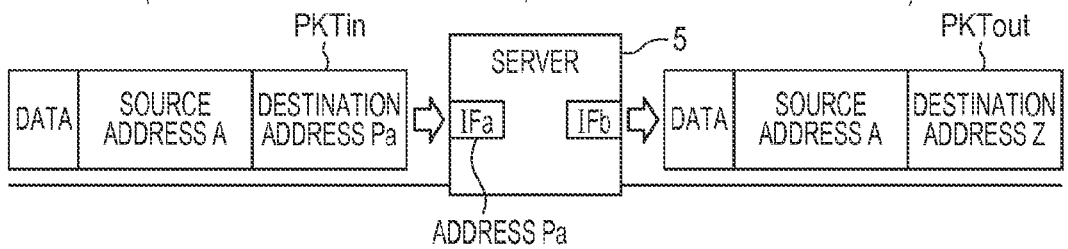

In FIG. 5C, a Type-3 (a second category) server 5 is illustrated. The Type-3 server 5 transmits the packet PKTin of which the destination address is changed and the source address is not changed. For example, the Type-3 server 5 receives the packet PKTin of which the destination address is "Pa" and of which the source address is "A" through the reception-side interface IFa, converts the received packet PKTin into the packet PKTout of which the destination address is "Z" and of which the source address is "A" and transmits the resulting packet PKToutput from the transmission-side interface IFb.

As the Type-3 server 5, a server equipped with a Destination based Network Address Translation (DNAT) function is given as an example. The DNAT has a function of converting an IP address of a destination of a received packet.

Figure 5D:
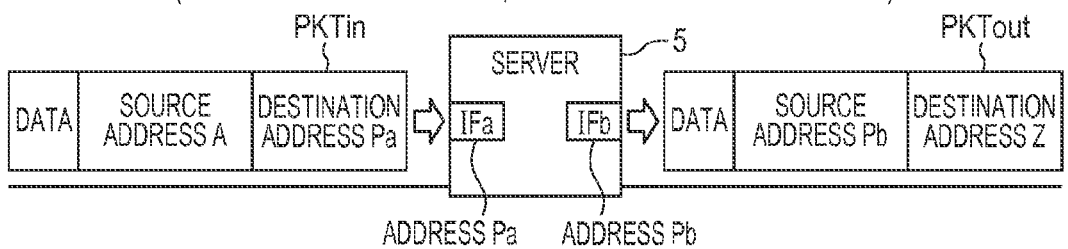

In FIG. 5D, a Type-4 (a third category) server 5 is illustrated. The Type-4 server 5 changes the destination address and source address of the packet PKTin. For example, the Type-4 server 5 receives the packet PKTin of which the destination address is "Pa" and of which the source address is "A" through the reception-side interface IFa, converts the received packet PKTin into the packet PKTout of which the destination address is "Z" and of which the source address is "Pb" and transmits the resulting packet PKToutput from the transmission-side interface IFb.

As the Type-4 server 5, a server equipped with a non-transparent proxy function or a non-transparent cache function is given as an example.

In this manner, regardless of functions of the servers 5, the network management server 1 categorizes the serves 5 into Type-1 to Type-4 according to the information that, among the destination address and source address of the packet, is changed by the server 5. As a case where the address is changed, a case where, as in the proxy server, the packet is transferred between different communication sessions, and a case where, as in the proxy server, transfer processing is performed on the IP address are given as examples. However, the network management server 1 categorizes the servers 5 based on a change type of the address of the relayed packet, without distinguishing between the two cases described above. For this reason, the network management server 1 can easily categorize the servers 5.

FIG. 6 is a configuration diagram illustrating one example of the network management server 1. The network management server 1 has a central processing unit (CPU) 10, a read only memory (ROM) 11, a random access memory (RAM) 12, a hard disk drive (HDD) 13, an input and output (I/O) unit 14, and a communication processing unit 15.

The CPU 10 is connected to the ROM 11, the RAM 12, the HDD 13, the I/O unit 14, and the communication processing unit 15 through a data bus 16, in such a manner that a signal can be input and output between them. Included in the ROM 11 is a program that drives the CPU 10. The RAM 12 functions as a working memory if the CPU 10.

Included in the HDD 13 is a topology database (DB) 13a, a categorization table 13b, and routing information 13c. The topology DB 13a consists of pieces of information indicating a configuration of the network NW, and is used in searching for the packet route. The categorization table 13b lists pieces of information indicating categories (Type-1 to Type-4) of the servers 5 within the network NW, and is used in generating the routing information 13c.

The I/O unit 14 performs input and output between an input device such as a keyboard or a mouse and an output device such as a display. The communication processing unit 15 is, for example, a network interface card, and communicates with the relay devices 2 and the servers 5 within in the network NW. Moreover, a type of communication may be either of cabled communication and wireless communication.

When a program is read from the ROM 11, functionally formed in the CPU 10 are a request processing unit 100, a route search unit 101, a routing information generation unit (a generation unit) 102, a server categorization unit (a categorization unit) 103, and a routing information setting unit 104.

The request processing unit 100 receives a request for the packet route from a user through the I/O unit 14. For example, designation of one or more servers 5 through which the packet passes is included in the request. Additionally, designation of the order in which the packet passes through every server 5 may be included in the request. The request processing unit 100 outputs the received request, as request information, to the route search unit 101.

The route search unit 101 searches the topology DB 13*a* for the route connecting everything from the transmission source terminal device 3 to the destination terminal device 4. Pieces of information relating to nodes within the network NW, to be more precise, the relay devices 2 and the servers 5, and links that connect between each node are registered in the topology DB 13*a* with the nodes and the links being associated with one another. Furthermore, pieces of information on nodes to which each of the transmission source terminal device 3 and the destination terminal device 4 is connected are registered in the topology DB 13*a*.

With the request information, the route search unit 101 searches for the route on which the designated servers 5 are present. For this reason, the route search unit 101 divides the route into a section from the transmission source terminal device 3 to a designated server among the servers 5, a section between the designated servers 5, and a section from the designated server 5 to the destination terminal device 4, and searches for the route based on segments. As a search technique, a Dijkstra method is given as an example, but is not limited to this. The route search unit 101 outputs the found route, as route configuration information, to the routing information generation unit 102.

Based on the route configuration information, the routing information generation unit 102 generates the routing information 13*c* for the relay devices 2 and the servers 5 on the route, and stores the generated routing information 13*c* in the HDD 13. When the generation of the routing information 13*c* for all the relay devices 2 and all the servers 5 on the route is completed, the routing information generation unit 102 notifies the routing information setting unit 104 of this.

The routing information generation unit 102 generates the routing information 13*c* according to a result of the server categorization unit 103 categorizing the servers 5 on the route. The routing information generation unit 102 outputs to the server categorization unit 103 the routing information described above and device information indicating which device the routing information 13*c* is generated for. Based on the route configuration information, the device information, and the categorization table 13*b*, the server categorization unit 103 detects the servers 5 on the route and categories the detected servers 5.

The route configuration information, for example, indicates identification information (for example, an IP addresses) on each of the relay devices 2 or the servers 5 on the found route and a device type (the relay device 2 or the server 5), sequentially along the route. The device information indicates the identification information on the relay devices 2 or the servers 5 for which the routing information 13*c* is generated. Included in the categorization table 13*b* are Type-1 to Type-4 into which the serves 5 within the network NW are categorized. That is, the pieces of identification information on and the categories of the servers 5 are registered in the categorization table 13*b* with the pieces of identification information and the categories being associated with one another.

The server categorization unit 103 notifies the routing information generation unit 102 of a result of the categorization of the servers 5. According to the result of the categorization of the servers 5, the routing information generation unit 102 determines at least one of the destination address and the source address that are set as the routing information 13*c*, and generates the routing information 13*c*. For this reason, even though the servers on the route 5 changes at least one of the destination address and source address of the packet that passes through the servers, the routing information generation unit 102 can generate the suitable routing information 13*c*. Moreover, a method of generating the routing information 13*c* will be described in detail below.

When the generation of the routing information 13*c* is notified from the routing information generation unit 102, the routing information setting unit 104 reads the routing information 13*c* from the HDD 13, and transmits the read routing information to the relay devices 2 and the serves 5 within the network NW through the communication processing unit 15. Accordingly, the routing information 13*c* is set to the relay devices 2 and the servers 5*b*.

FIG. 7 is a configuration diagram illustrating one example of the servers 5 within the network NW. The servers 5 each have a CPU 50, a ROM 51, a RAM 52, a HDD 53, an I/O unit 54, and multiple interface units 55.

The CPU 50 is connected to the ROM 51, the RAM 52, the HDD 53, the I/O unit 54, and the multiple interface (INF) units 55 through a data bus 56, in such a manner that a signal can be input and output between them. Included in the ROM 51 is a program that drives the CPU 50. The RAM 52 functions as a working memory if the CPU 50.

Stored in the HDD 53 is routing information 53*a* received from the network management server 1. The I/O unit 54 performs input and output between an input device such as a keyboard or a mouse and an output device such as a display.

The interface unit 55, for example, is a network interface card, and communicates with different relay devices 2 and different servers 5 within the network NW. The interface unit 55 is installed in every interface IFm described above.

When a program is read from the ROM 51, a packet processing unit 500 and a transfer processing unit 501 are functionally formed in CPU 50. The packet processing unit 500 processes the packet received through the interface unit 55. Contents of the processing vary with each of the servers 5.

The transfer processing unit 501 transfers the packet that goes through the processing by the packet processing unit 500, based on the routing information 53*a*. The transfer processing unit 501 outputs the packet that is consistent with at least one of the destination address and the source address that are indicated by the routing information 53*a*, to the interface unit 55 that corresponds to an output interface that is indicated by the routing information 53*a*. Accordingly, the packet is transferred to the suitable transfer destination along the route.

Figure 8:
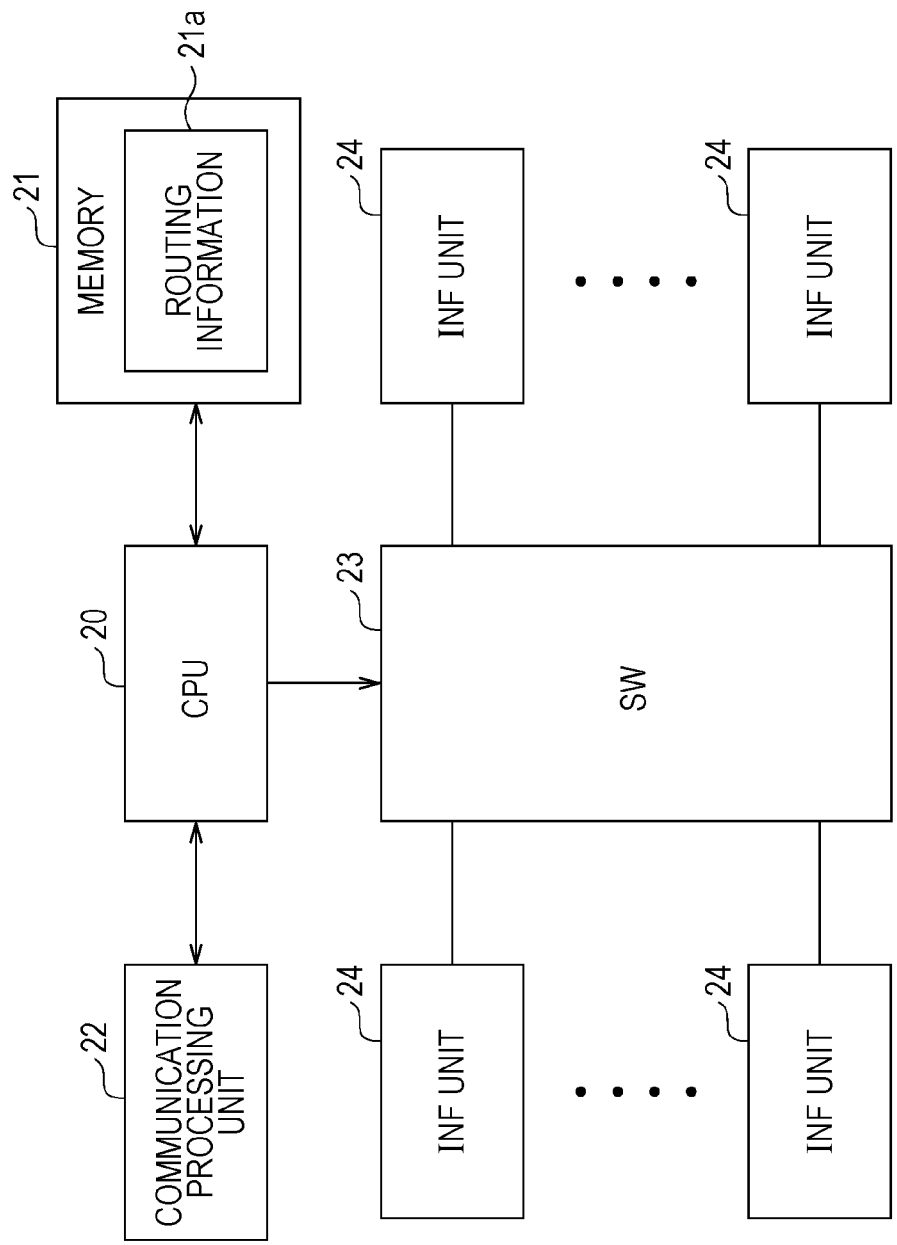
FIG. 8 is a configuration diagram illustrating one example of the relay devices.

FIG. 8 is a configuration diagram illustrating one example of the relay devices 2. The relay devices 2 each have a CPU 20, a memory 21, a communication processing unit 22, a switch (SW) 23, and multiple interface (INF) units 24.

The CPU 20 controls the operation of all the relay devices 2. The CPU 20 communicates with the network management server 1 through the communication processing unit 22. The CPU 20 stores routing information 21*a* received from the network management server 1 in the memory 21.

The switch 23 is connected to the multiple interface units 24. The interface unit 24 is installed in every interface IFn described above.

The CPU 20 sets the routing information 21*a* stored in the memory 21 to the switch. The switch 23 exchanges the packet between each interface unit 24, according to the routing information 21*a*.

The switch 23 outputs the packet that is consistent with at least one of the destination address and the source address that are indicated by the routing information 21a, to the interface unit 24 that corresponds to an output interface that is indicated by the routing information 21a. Accordingly, the packet is transferred to the suitable transfer destination along the route.

Figure 9:
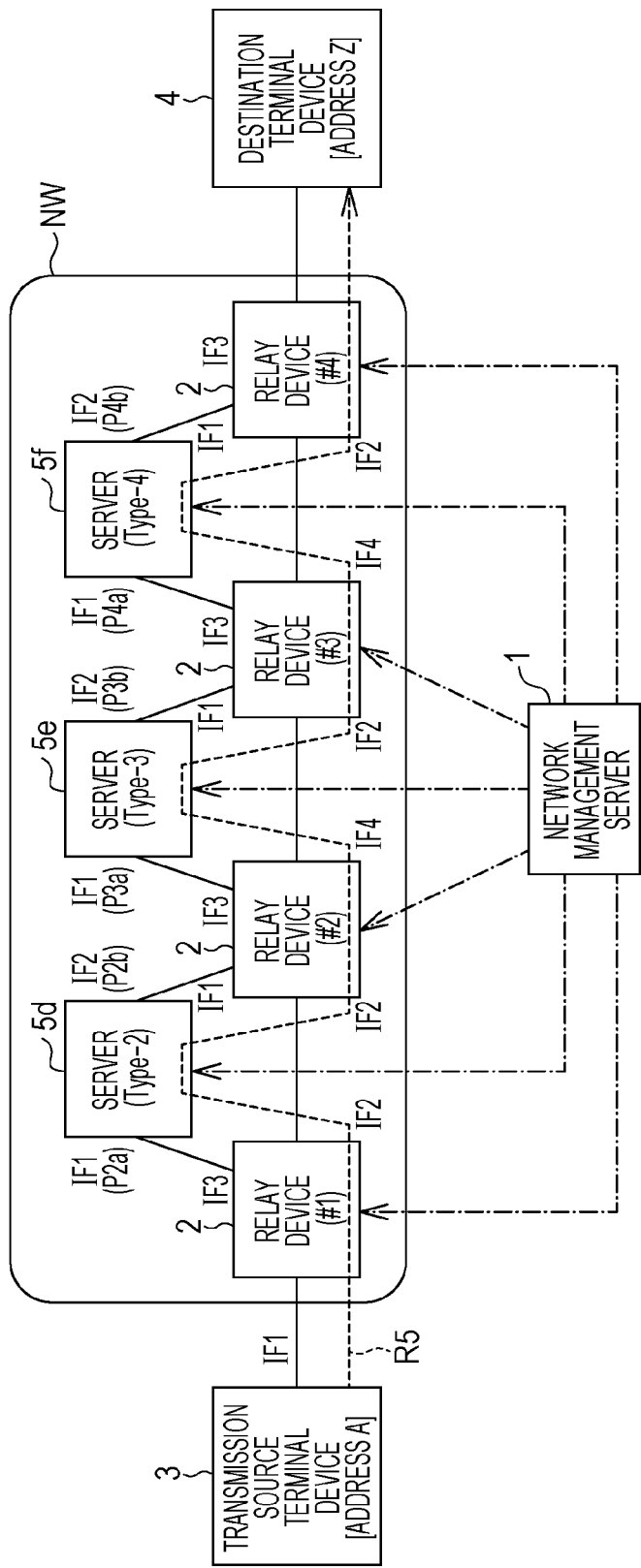
FIG. 9 is a configuration diagram illustrating one example of the network for which the routing information is set.

Next, a method in which the network management server 1 generates the routing information will be described in detail below. FIG. 9 is a configuration diagram illustrating one example of the network NW for which the routing information is set. In FIG. 9, constituent elements that are the same as those illustrated in FIGS. 1 to 4 are given the same reference numerals and descriptions of them are omitted.

The network NW in the present example includes the relay devices (#1 to #4) 2 and the servers 5d to 5f. Instead of the servers 5a to 5c in FIG. 4, servers 5d to 5f are installed. The servers 5d to 5f are categorized into Type-2, Type-3, and Type-4.

The server 5d is connected to the relay devices (#1 and #2) 2 through interfaces IF1(IFa) and IF2(IFb), respectively. At this point, addresses of the interfaces IF1 and IF2 are set to be "P2a" and "P2b".

The server 5e is connected to the relay devices (#2 and #3) 2 through interfaces IF1 and IF2, respectively. At this point, the addresses of the interfaces IF1 and IF2 are set to be "P3a" and "P3b".

The server 5f is connected to the relay devices (#3 and #4) 2 through interfaces IF1 and IF2, respectively. At this point, the addresses of the interfaces IF1 and IF2 are set to be "P4a" and "P4b".

Furthermore, the relay device (#1) 2 is connected to the transmission source terminal device 3 through the interface IF1, and is connected to the relay device (#2) 2 through the interface IF2. Additionally, the relay device (#1) 2 is connected to the server 5d through the interface IF3.

The relay device (#2) 2 is connected to the server 5d through the interface IF1, and is connected to the relay device (#1) 2 through the interface IF2. Additionally, the relay device (#2) 2 is connected to the server 5e through the interface IF3, and is connected to the relay device (#3) 2 through the interface IF4.

The relay device (#3) 2 is connected to the server 5e through the interface IF1, and is connected to the relay device (#2) 2 through the interface IF2. Additionally, the relay device (#3) 2 is connected to the server 5f through the interface IF3, and is connected to the relay device (#4) 2 through the interface IF4.

The relay device (#4) 2 is connected to the server 5f through the interface IF1, and is connected to the relay device (#3) 2 through the interface IF2. Additionally, the relay device (#4) 2 is connected to the destination terminal device 4 through the interface IF3.

The route search unit 101 searches for a packet route R5. The packet that is transferred over the route R5 passes through the relay device (#1) 2, the server 5d, the relay device (#2) 2, the server 5e, the relay device (#3) 2, the server 5f, and the relay device (#4) 2, in this sequence.

Figure 10:
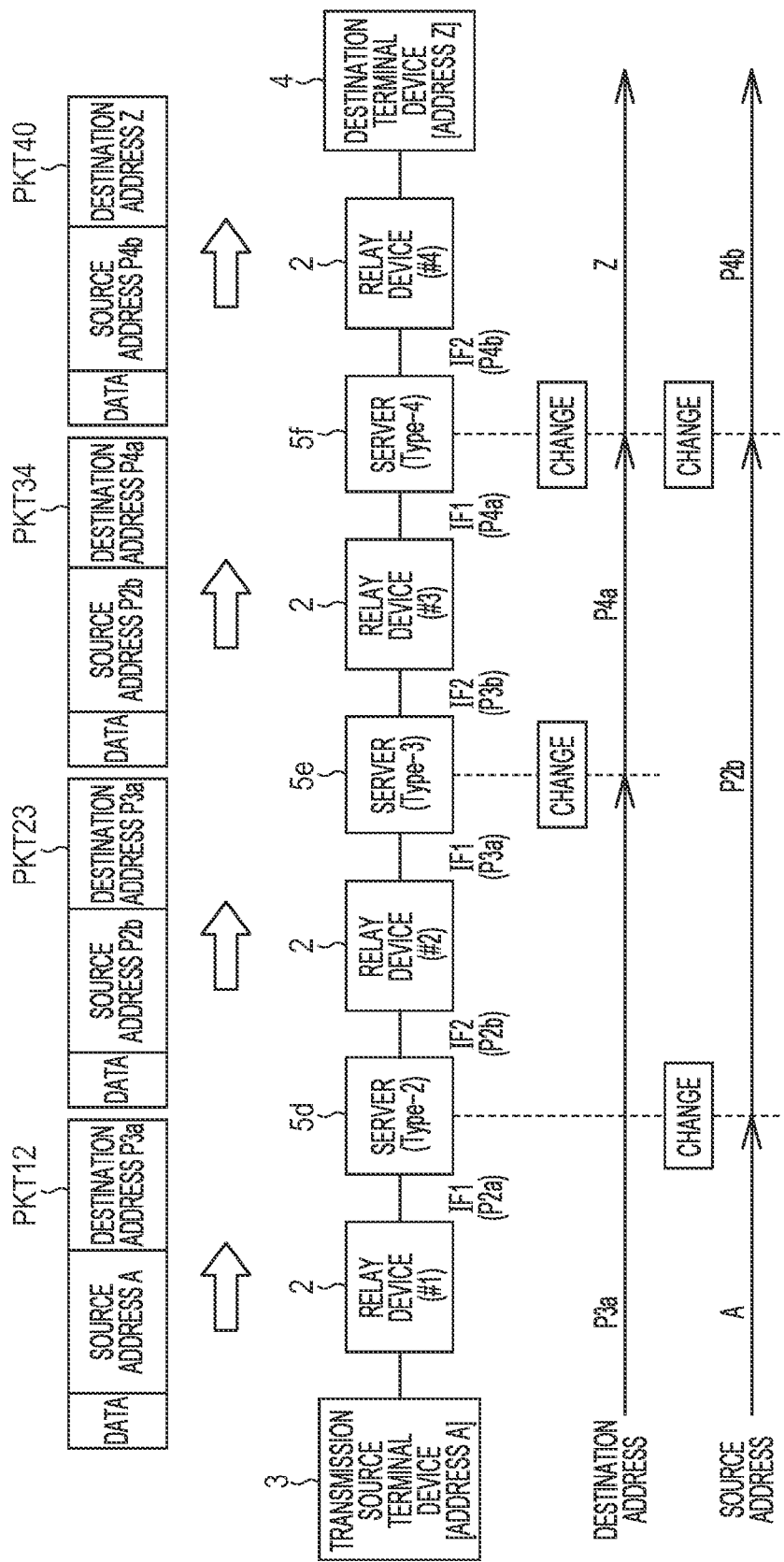
FIG. 10 is a diagram illustrating a situation in which a destination address and a source address are changed on a packet route.

In FIG. 10, a situation in which the destination address and the source address are changed on the packet route R5. Illustrated in FIG. 10 are a packet PKT 12 that is transferred from the transmission source terminal device 3 to the server 5d through the relay device (#1) 2, and a packet PKT 23 that is transferred from the server 5d to the server 5e through the relay device (#2) 2. Additionally illustrated in FIG. 10 are a packet PKT 34 that is transferred from the server 5e to the server 5f through the relay device (#3) 2, and a packet PKT 40 that is transferred from the server 5f to the destination terminal device 4 through the relay device (#4) 2.

The Type-3 server 5e and the Type-4 server 5f change the destination addresses of the received packets PKT 23 and PKT34. For this reason, the destination addresses of the packets PKT 12 and PKT 23 indicate the interface IF1 of the server 5e, to be more precise, "P3a", and the destination address of the packet PKT 34 indicates the interface IF1 of the server 5f, to be more precise, "P4a". Furthermore, the destination address of the packet PKT 40 indicates the destination terminal device 4, to be more precise, "Z".

Furthermore, the Type-2 server 5d and the Type-4 server 5f change source addresses of the received packets PKT 12, PKT23, and PKT34. For this reason, the source address of the packet PKT 12 indicates the transmission source terminal device 3, to be more precise, "A", and the source addresses of the packets PKT23 and PKT34 indicate the interface IF2 of the server 5d, to be more, "P2b". Furthermore, the source address of the packet PKT 40 indicates the interface IF2 of the server 5f, to be more precise, "P4b".

By categorizing the servers 5d to 5f on the route R5, the network management server 1 recognizes information that, among the destination address and source address of the packet, is changed in the servers 5d to 5f, and generates the routing information according to the changed information. A generation method according to first to fourth embodiments will be described below.

First Embodiment

According to the present embodiment, the network management server 1 searches for the Type-3 or Type-4 server 5e or 5f that is present to the destination sides (downward sides) of the relay devices 2 or the servers 5d to 5f on the route R5, for which the routing information is generated, or searches for the destination terminal device 4. The network management server 1 generates the routing information, based on an address of the found Type-3 or Type-4 server 5e or 5f or an address of the found destination terminal device 4.

Figure 11:
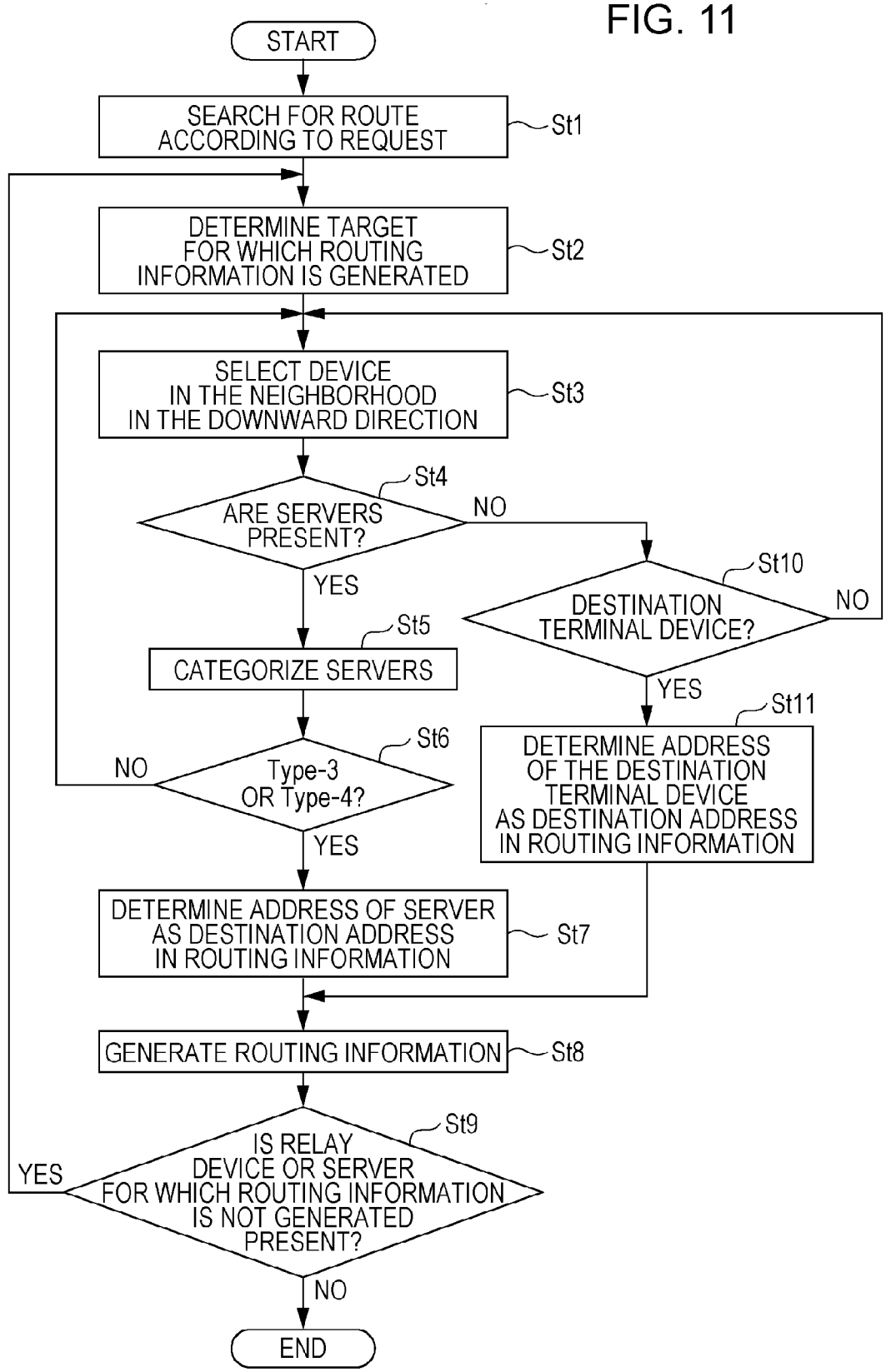
FIG. 11 is a flowchart illustrating processing that generates the routing information according to a first embodiment.

FIG. 11 a flowchart illustrating processing that generates the routing information according to the first embodiment. First, the route search unit 101 searches for the route according to a request (an operation St1). Accordingly, the route R5 on which the indicated servers 5d to 5f are present is searched for.

Next, the routing information generation unit 102 determines the relay devices 2 or the servers 5d to 5f for which the routing information is generated, from the relay devices 2 and the servers 5d to 5f on the route R5 (an operation St2). Next, based on the route configuration information, the server categorization unit 103 selects a device that is a node in the neighborhood in the downstream direction (in the destination side direction), of the relay devices 2 and the servers 5d to 5f for which the routing information is generated (an operation St3).

Next, based on the route configuration information, the server categorization unit 103 determines whether or not the device of which the selection is in progress is the servers 5d to 5f (an operation St4). In a case where the device of which the selection is in progress is the servers 5d to 5f (Yes in the operation St4), the server categorization unit 103 categories the servers 5d to 5f based on the categorization table 13b (an operation St5).

Next, in a case where, as a result of the categorization, the servers 5d to 5f are categorized into Type-3 or Type-4 (Yes in an operation St6), the routing information generation unit 102 determines addresses of the servers 5d to 5f as destination addresses in the routing information (an operation St7). Next, the routing information generation unit 102 generates the routing information based on the determined destination address (an operation St8).

Furthermore, in a case where the selected device is not the servers 5d to 5f (No in the operation St4), the server categorization unit 103 determines whether or not the device of which the selection is in progress is the destination terminal device 4 (an operation St 10). In a case where the device of which the selection is in progress is the destination terminal device 4 (Yes in the operation St 10), the routing information generation unit 102 determines an address "Z" of the destination terminal device 4 as the destination address in the routing information (an operation St 11). Next, the routing information generation unit 102 generates the routing information based on the determined destination address (an operation St8).

In a case where the device of which the selection is in progress is not the destination terminal device 4 (No in the operation St10), the server categorization unit 103 again performs the processing in the operation St3. In this case, the server categorization unit 103 selects the device that is a node in the neighborhood in the downstream direction, of the device of which the selection is in progress.

Furthermore, in a case where, as the result of the categorization, the servers 5d to 5f are categorized into Type-1 or Type-2 (No in the operation St6), the server categorization unit 103 again performs the processing in the operation St3 as well. Also in this case, the server categorization unit 103 selects the device that is a node in the neighborhood, in the downstream direction, of the device of which the selection is in progress.

In this manner, the server categorization unit 103 searches the device on the route R5 in the downstream direction (in the destination side direction), until the Type-3 or Type-4 server 5e or 5f, or the destination terminal device 4 is detected. Then, the routing information generation unit 102 generates the routing information based on the address of Type-3 or Type-4 server 5e, 5f, or the destination terminal device 4 that is first detected.

After the routing information is generated (the operation St8), if the relay devices 2 and the servers 5d to 5f for which the routing information is not generated are present (Yes in the operation St9), the routing information generation unit 102 again performs the processing in the operation St2. If the relay devices 2 and the servers 5d to 5f for which the routing information is not generated are present (No in the operation St9), the routing information generation unit 102 again performs the processing in the operation St2. In this manner, the processing that generates the routing information is performed.

Figure 12:
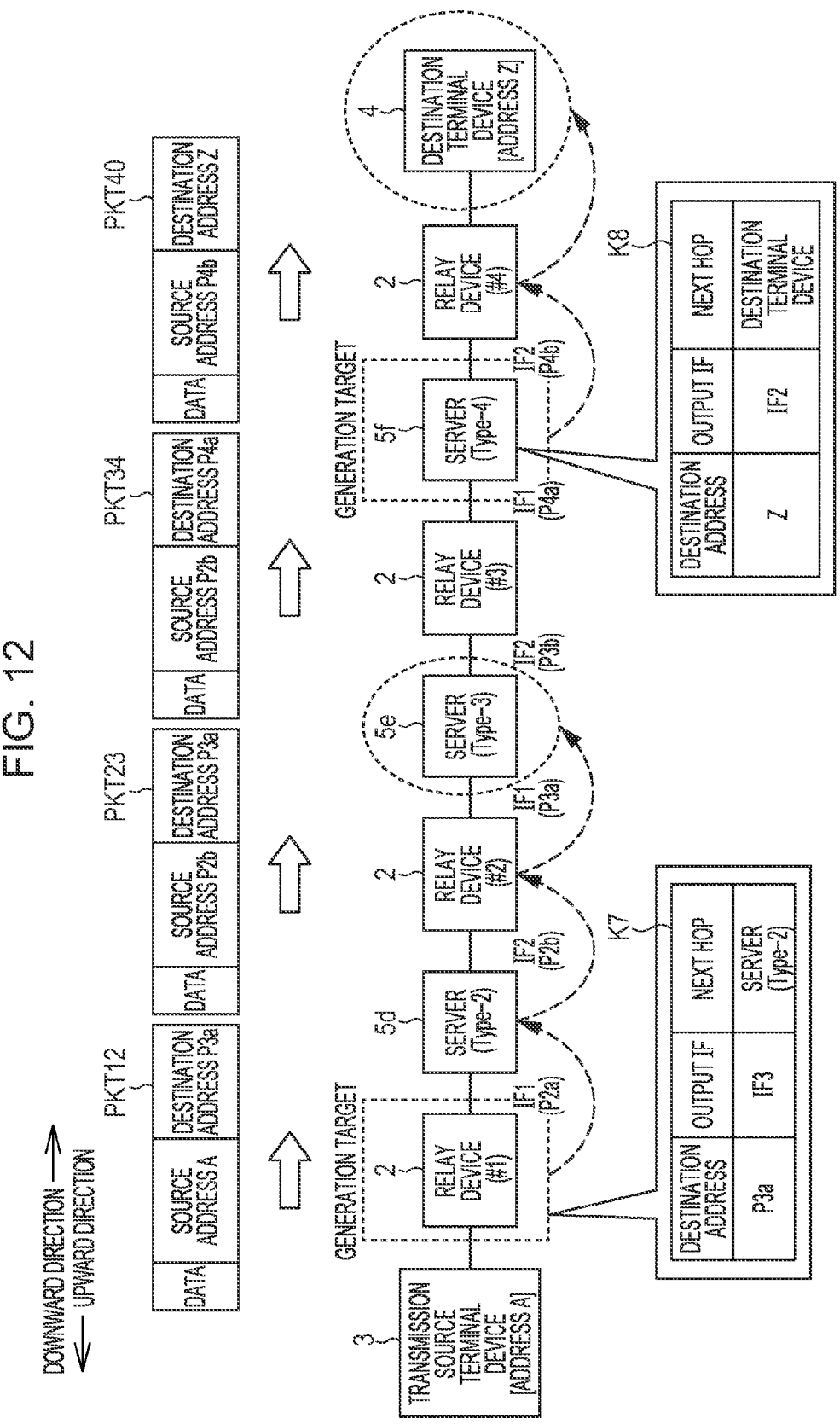
FIG. 12 is a diagram illustrating an example of generating the routing information according to the first embodiment.

In FIG. 12, an example of generating the routing information according to the present embodiment is illustrated. In FIG. 12, an example of generating the routing information for the relay device (#1) 2 and the server 5f is given. Moreover, in FIG. 12, an arrow indicates the order in which the network devices are selected by the server categorization unit 103 as detection targets.

In a case where a target for which the routing information is generated is determined as the relay device (#1) 2, the server categorization unit 103 selects the server 5d that is a node in the neighborhood in the downstream direction, of the relay device (#1) 2 (refer to the operation St3). Because, as a result of the categorization (refer to the operation St5), the server 5d is neither Type-3 nor Type-4 (refer to No in the operation St6), the server categorization unit 103 selects the relay device (#2) 2 that is a node in the neighborhood in the downward, of the server 5d (refer to the operation St3).

Because the relay device (#2) 2 is neither the server (refer to No in the operations St4), nor the destination terminal device 4 (refer to No in the operation St10), the server categorization unit 103 selects the server 5e that is a node in the neighborhood in the downstream direction, of the relay device (#2) 2 (refer to the operation St3). Because the server 5e is categorized into Type-3 (refer to Yes in the operation St6), the routing information generation unit 102 generates the routing information based on the address "P3a" OF the interface IF1 in the upstream direction (in the direction of the transmission source), of the server 5e (refer to the operations St7 and St8).

Therefore, the "destination address" in routing information K7 for the relay device (#1) 2 indicates "P3a". In a case where an address of the server 5e is only one without being provided to each of the interfaces IF1 and IF2, the "destination address" in the routing information K7 indicates the address of the relay device (#1) 2. Moreover, the "output interface" and the "NEXT HOP" in the routing information K7 indicate "IF3" and "server (Type-2)", respectively.

Furthermore, in a case where the target for which the routing information is generated is determined as the server 5f, the server categorization unit 103 selects the relay device (#4) 2 that is a node in the neighborhood in the downstream direction, of the server 5f (refer to the operation St3). Because the relay device (#4) 2 is neither the server (refer to No in the operation St4), nor the destination terminal device 4 (refer to No in the operation St10), the server categorization unit 103 selects the destination terminal device 4 that is a node in the neighborhood in the downstream direction, of the relay device (#4) 2 (refer to the operation St3). Because the destination terminal device 4 is selected (refer to Yes in the operation St10), the routing information generation unit 102 generates the routing information based on the address "Z" of the destination terminal device 4 (refer to the operations St7 and St8).

Therefore, the "destination address" in the routing information K8 for the server 5f indicates "Z". Moreover, the "output interface" and the "NEXT HOP" in the routing information K8 indicate "IF2" and "destination terminal device", respectively.

In this manner, the server categorization unit 103 sequentially selects the detection target network devices in such a manner that the packet route starting from the relay devices 2 or the servers 5d to 5f for which the routing information is generated leads to the destination (the destination terminal device 4) of the packet. The routing information generation unit 102 generates the routing information based on the destination address indicating Type-3 or Type-4 server 5e or 5f, or the destination terminal device 4 that is first detected by the server categorization unit 103.

According to the present embodiment, the routing information for the individual relay devices 2 or the individual servers 5d to 5f can be easily generated based on the result of the detection of the node (refer to FIG. 10) of which the destination address is changed.

Second Embodiment

However, according to the first embodiment, because as many as the relay devices 2 and the serves 5d to 5f on the route R5 is searched among the network devices on the route R5, the greater the number of devices, the more time it takes to generate the routing information. Then, as in a technique described below, with the one-time search of the network devices on the route R5, the time it takes to perform generation processing may be shortened by generating the routing information for the each of the relay devices 2 and each of the servers 5d to 5f on the route R5. Moreover, according to the present embodiment, it is also assumed that the routing information for each of the relay devices 2 and each of the servers 5d to 5f on the route R5 is generated to configure the route R5 over the network NW illustrated in FIGS. 9 and 10.

Figure 13:
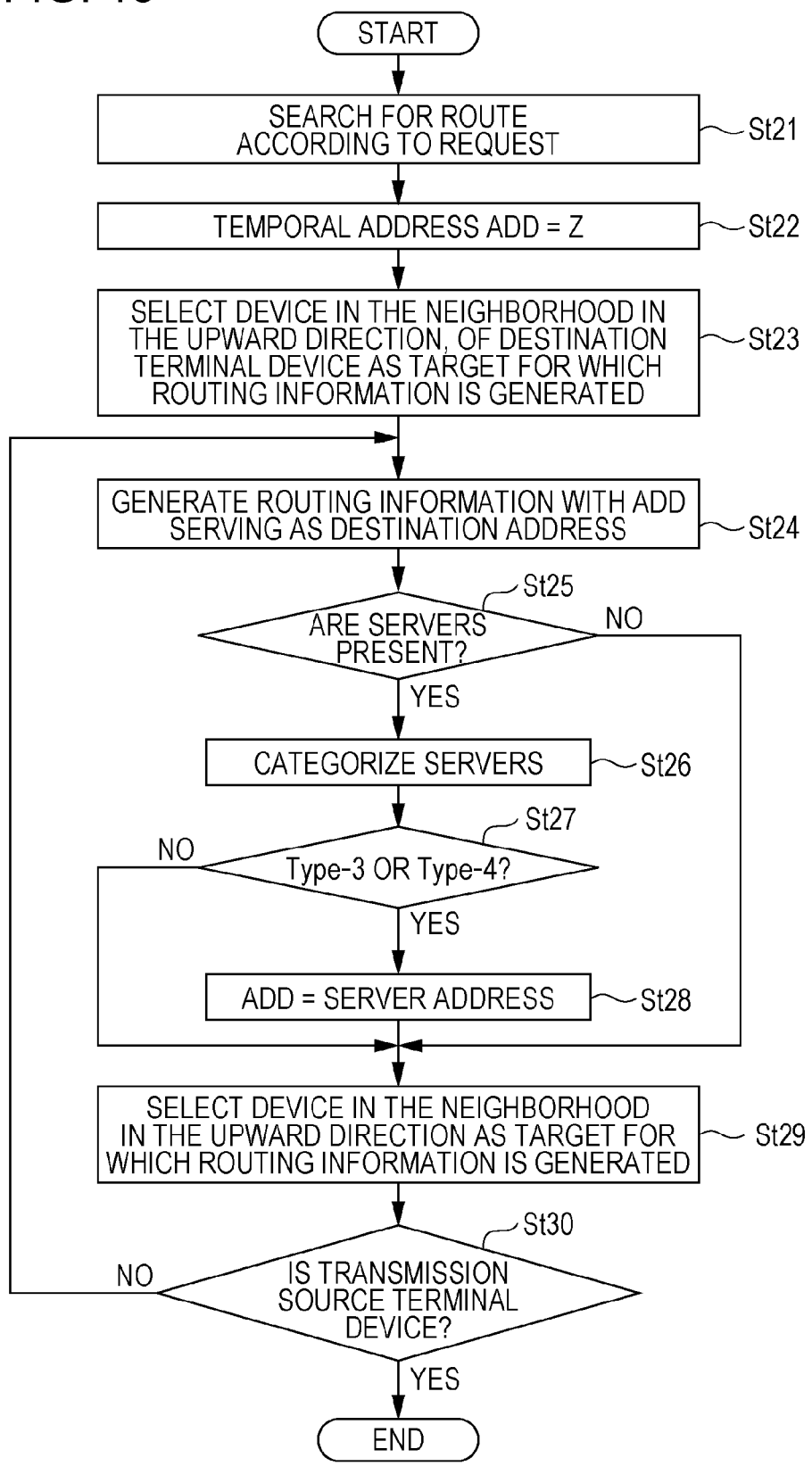
FIG. 13 is a flowchart illustrating processing that generates the routing information according to a second embodiment.

FIG. 13 is a flowchart illustrating processing that generates the routing information according to the second embodiment. First, the route search unit 101 searches for the route according to a request (an operation St21). Accordingly, the route R5 on which the indicated servers 5d to 5f are present is searched for.

Next, the routing information generation unit 102 sets the address "Z" of the destination terminal device 4 to be a temporary address ADD corresponding to the destination address in the routing information (an operation St22). The temporary address ADD, as described below, is used as the destination address in the routing information for the network device on the route R5, and is changed to the address of the server 5e or 5f whenever Type-3 or Type-4 server 5e or 5f is detected. The temporary address ADD, for example, is temporarily stored in a storage unit, for example, such as the HDD 13.

Next, based on the route configuration information, the routing information generation unit 102 selects a device that is a node in the neighborhood in the upstream direction (in the direction of the transmission source), of the destination terminal device 4, as a target for which the routing information is generated (an operation St23). That is, the routing information generation unit 102 selects the relay device (#4) 2.

Next, the routing information generation unit 102 generates the routing information for a device of which the selection is in progress, with the temporary ADD serving as the destination address (an operation St24). Next, based on the route configuration information, the server categorization unit 103 determines whether or not the device of which the selection is in progress is the servers 5d to 5f (an operation St25).

In a case where the device of which the selection is in progress is not the servers 5d to 5f (No in the operation St25), based on the route configuration information, the routing information generation unit 102 selects a device that is a node in the neighborhood in the upstream direction, of the device of which the selection is in progress, as the target for which the routing information is generated (an operation St29). For example, in a case where the device of which the selection is in progress is the relay device (#4) 2, the routing information generation unit 102 selects the server 5f in the neighborhood of the relay device (#4) 2.

Next, the server categorization unit 103 determines whether or not the device of which the selection is in progress is the transmission source terminal device 3 (an operation St30). In a case where the device of which the selection is in progress is not the transmission source terminal device 3 (No in the operation St30), to be more precise, in a case where the device of which the selection is in progress is the relay devices 2, the routing information generation unit 102 again performs the processing in the operation St24.

In a case where the device of which the selection is in progress is the servers 5d to 5f (Yes in the operation St25), the server categorization unit 103 categorizes the servers 5d to 5f based on the categorization table 13b (an operation St26). Next, in a case where, as a result of the categorization, the servers 5d to 5f are categorized into Type-3 or Type-4 (Yes in the operation St27), the routing information generation unit 102 sets addresses of the servers 5d to 5f to be the temporary address ADD (an operation St28). That is, the routing information generation unit 102 writes the temporary address ADD in storage to the addresses of the servers 5d to 5f. Thereafter, in the operation St29, the next-neighboring device is selected.

Furthermore, also in the case where, as the result of the categorization, the servers 5d to 5f are categorized into Type-1 or Type-2 (No in the operation St27), the next-neighboring device is selected in the operation St29.

Furthermore, in a case where the device that is selected in the operation St29 is the transmission source device 3 (Yes in the operation St30), because the search of all the devices on the route R5 is ended, the routing information generation unit 102 ends the processing.

Figure 14:
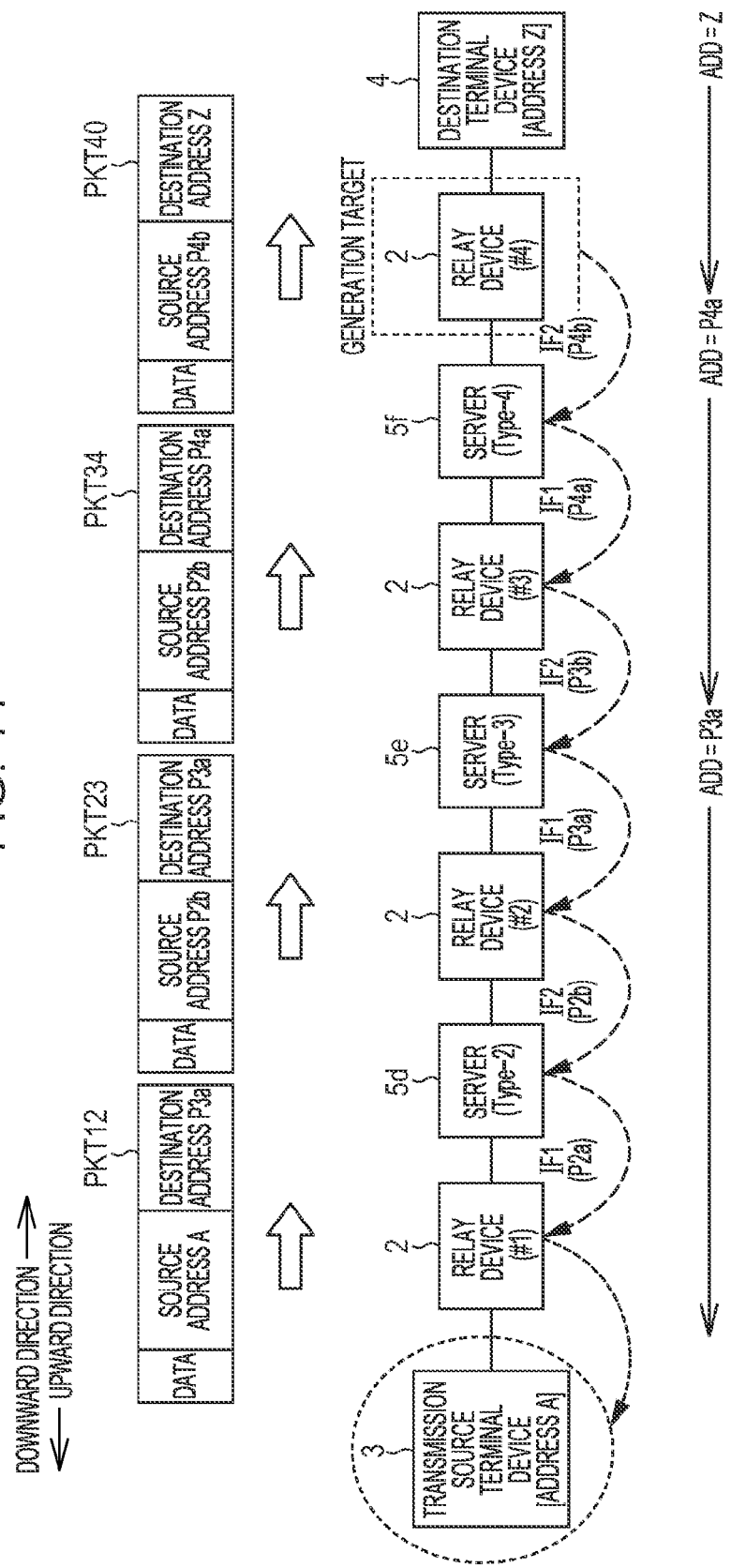
FIG. 14 is a diagram illustrating an example of generating the routing information according to the second embodiment.

In FIG. 14, an example of generating the routing information according to the present embodiment is illustrated. Moreover, in FIG. 14, a dotted-line arrow indicates the order in which the network devices are selected by the routing information generation unit 102 as targets for which the routing information is generated, and a solid line arrow ADD indicates a change in a value of the temporary address described below.

First, the routing information generation unit 102 sets the address "Z" of the destination terminal device 4 to be the temporary address ADD (refer to the operation St22), and selects the relay device (#4) 2 as the target for which the routing information is generated (refer to the operation St23). The routing information generation unit 102 generates the routing information for the relay device (#4) 2 based on the temporary address ADD="Z" (refer to the operation St24).

Next, the routing information generation unit 102 selects the server 5f that is a node in the neighborhood in the upstream direction, of the relay device (#4) 2, as the target for which the routing information is generated (refer to the operation St29). The routing information generation unit 102 generates the routing information for the server 5f based on the temporary address ADD="Z" (refer to the operation St24).

Because the server 5f is categorized by the server categorization unit 103 into Type-4 (refer to Yes in the operation St27), the routing information generation unit 102 sets the address "P4a" of the server 5f of which the selection is in progress to be the temporary address ADD (refer to the operation St28). At this time, the routing information generation unit 102 sets the address "P4a" of the interface IF1 in the upstream direction (in the direction of the transmission source), of the server 5f, to be the temporary ADD. In the case where the address of the server 5f is only one without being provided to each of the interfaces IF1 and IF2, the address of the server 5f is set to be the temporary address ADD.

Next, the routing information generation unit 102 selects the relay device (#3) 2 that is a node in the neighborhood in the upstream direction, of the server 5f, as the target for which the routing information is generated (refer to the operation St29). The routing information generation unit 102 generates the routing information for the relay device (#3) 2 based on the temporary address ADD="P4a" (refer to the operation St24).

Next, the routing information generation unit 102 selects the server 5e that is a node in the neighborhood in the upstream direction, of the relay device (#3) 2, as the target for which the routing information is generated (refer to the operation St29). The routing information generation unit 102 generates the routing information for the server 5e based on the temporary address ADD="P4a" (refer to the operation St24).

Because the server 5e is categorized by the server categorization unit 103 into Type-3 (refer to Yes in the operation St27), the routing information generation unit 102 sets the address "P3a" of the server 5f of which the selection is in progress to be the temporary address ADD (refer to the operation St28). At this time, the routing information generation unit 102 sets the address "P3a" of the interface IF1 in the upstream direction (in the direction of the transmission source), of the server 5e, to be the temporary ADD. In the case where the address of the server 5e is only one without being provided to each of the interfaces IF1 and IF2, the address of the server 5e is set to be the temporary address ADD.

Next, the routing information generation unit 102 selects the relay device (#2) 2 that is a node in the neighborhood in the upstream direction, of the server 5e, as the target for which the routing information is generated (refer to the operation St29). The routing information generation unit 102 generates the routing information for the relay device (#2) 2 based on the temporary address ADD="P3a" (refer to the operation St24).

Next, the routing information generation unit 102 selects the server 5d that is a node in the neighborhood in the upstream direction, of the relay device (#2) 2, as the target for which the routing information is generated (refer to the operation St29). The routing information generation unit 102 generates the routing information for the server 5d based on the temporary address ADD="P3a" (refer to the operation St24).

Because the server 5d is categorized by the server categorization unit 103 into Type-2 (refer to No in the operation St27), the routing information generation unit 102 does not change the temporary ADD.

Next, the routing information generation unit 102 selects the relay device (#1) 2 that is a node in the neighborhood in the upstream direction, of the server 5d, as the target for which the routing information is generated (refer to the operation St29). The routing information generation unit 102 generates the routing information for the relay device (#1) 2 based on the temporary address ADD="P3a" (refer to the operation St24). Next, the routing information generation unit 102 selects the transmission source terminal device 3 that is a node in the neighborhood in the upstream direction, the relay device (#1) 2, but because the transmission source terminal device 3 is not the target for which the routing information is generated, ends the search (refer to Yes in the operation St30).

In this manner, the routing information generation unit 102 sequentially selects the network device for which the routing information is generated, in such a manner that the packet route R5 starting from the destination terminal device 4 leads to the transmission source terminal device 3. When a network device for which the routing information is generated is categorized into Type-3 or Type-4, the routing information generation unit 102 generates the routing information for a network device for which the routing information is generated, which is selected after the Type-3- or Type-4-categorized network device, based on the destination address indicating the Type-3- or Type-4-categorized network device.

According to the present embodiment, because, with the one-time search of the network devices on the route R5, the routing information for each of the relay devices 2 and each of the servers 5d to 5f on the route R5 can be generated, the time it takes to perform the generation processing can be shortened.

Third Embodiment

According to the first and second embodiments, the technique is given in which the routing information is generated based on only the destination address among the destination address and the source address, but the routing information may be generated based on both of the destination address and the source address. In this case, the relay devices 2 and the servers 5d to 5f on the route R5 specify the transfer target packet based on both of the destination address and the source address. For this reason, the transmission source terminal device 3 and the destination terminal device 4 can perform bidirectional communicate over the route R5.

According to the present embodiment, the network management server 1 determines the destination address with the same technique as that employed according to the first embodiment, and determines the source address with a technique similar to that employed according to the first embodiment. Moreover, according to the present embodiment, it is also assumed that the routing information for each of the relay devices 2 and each of the servers 5d to 5f on the route R5 is generated to configure the route R5 on the network NW illustrated in FIGS. 9 and 10.

Figure 15A:
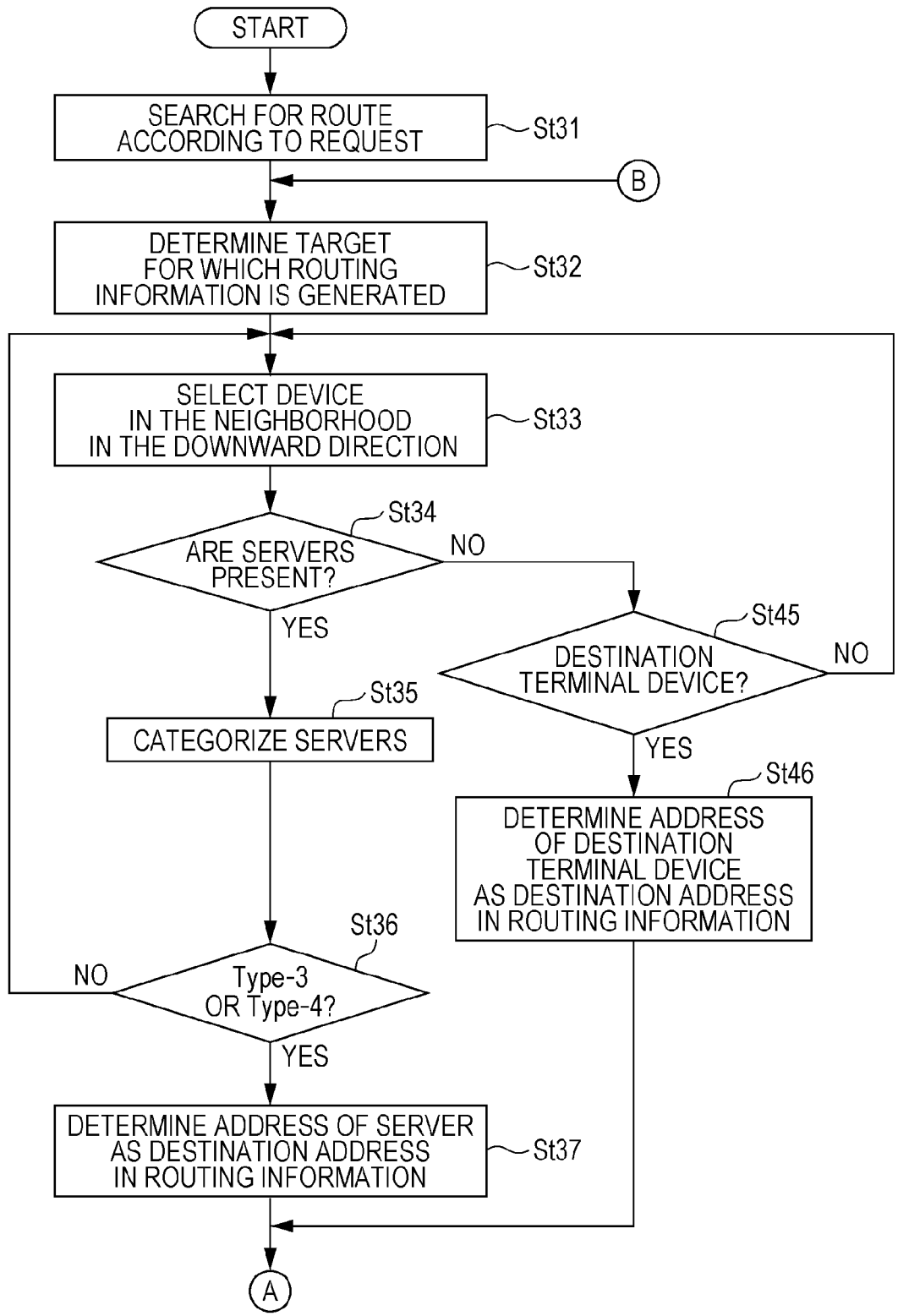
FIGS. 15A and 15B are flowcharts illustrating processing that generates the routing information according to a third embodiment.
Figure 15B:
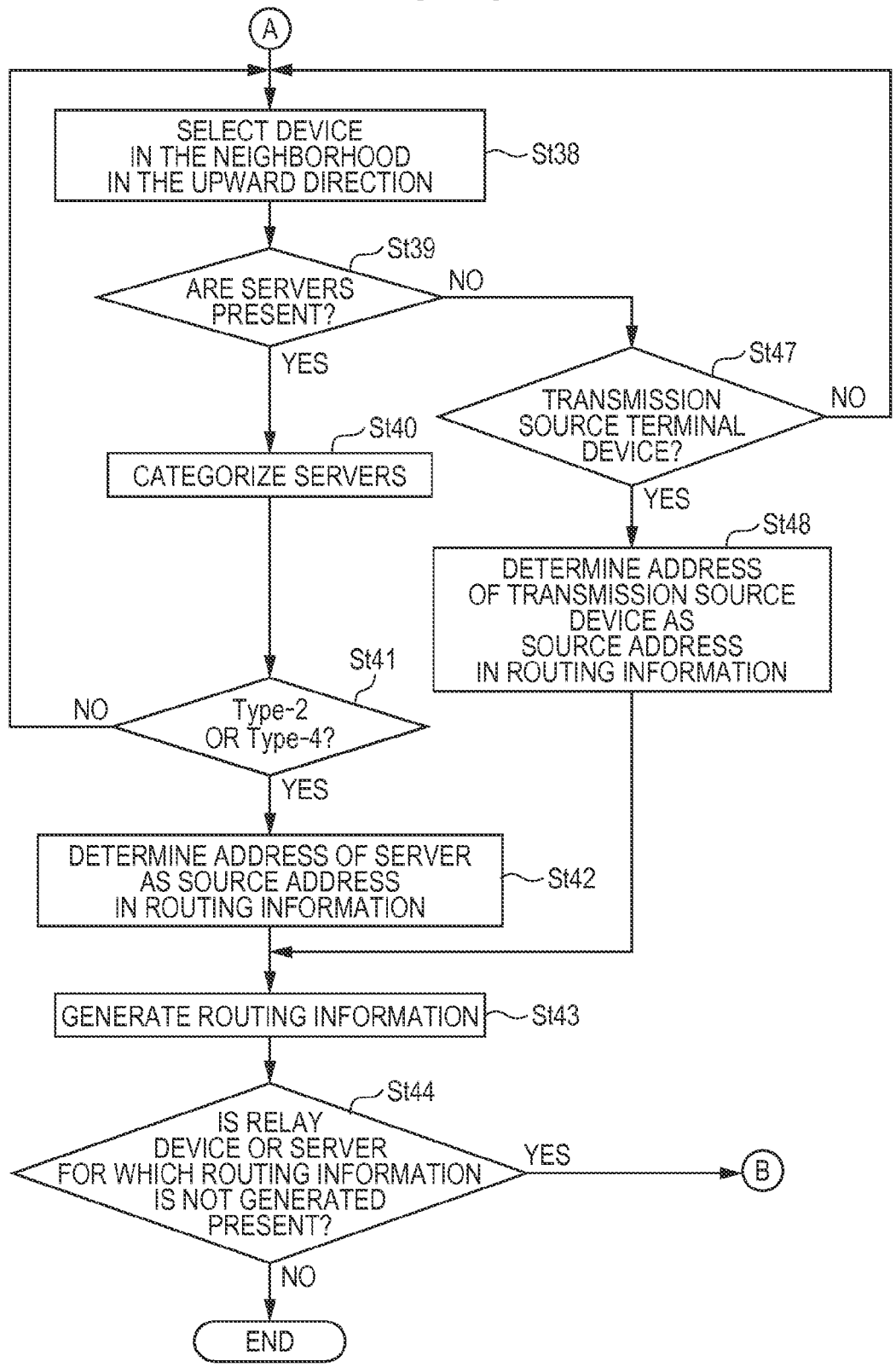

FIGS. 15A and 15B are flowcharts illustrating the processing that generates the routing information according to a third embodiment. First, the route search unit 101 searches for the route according to a request (an operation St31). Accordingly, the route R5 on which the indicated servers 5d to 5f are present is searched for.

Next, the routing information generation unit 102 determines the relay devices 2 or the servers 5d to 5f for which the routing information is generated, from the relay devices 2 and the servers 5d to 5f on the route R5 (an operation St32). Next, based on the route configuration information, the server categorization unit 103 selects a device that is a node in the neighborhood in the downstream direction (in the destination side direction), of the relay devices 2 and the servers 5d to 5f for which the routing information is generated (an operation St33).

Next, based on the route configuration information, the server categorization unit 103 determines whether or not the device of which the selection is in progress is the servers 5d to 5f (an operation St34). In the case where the device of which the selection is in progress is the servers 5d to 5f (Yes in the operation St34), the server categorization unit 103 categories the servers 5d to 5f based on the categorization table 13b (an operation St35).

Next, in the case where, as the result of the categorization, the servers 5d to 5f are categorized into Type-3 or Type-4 (Yes in the operation St36), the routing information generation unit 102 determines the addresses of the servers 5d to 5f as the destination address in the routing information (an operation St37).

Furthermore, in the case where the selected device is not the servers 5d to 5f (No in the operation St34), the server categorization unit 103 determines whether or not the device of which the selection is in progress is the destination terminal device 4 (an operation St45). In the case where the device of which the selection is in progress is the destination terminal device 4 (Yes in the operation St45), the routing information generation unit 102 determines an address "Z"

of the destination terminal device 4 as the destination address in the routing information (an operation St46).

In the case where the device of which the selection is in progress is not the destination terminal device 4 (No in the operation St45), the server categorization unit 103 again performs the processing in the operation St33. In this case, the server categorization unit 103 selects the device that is a node in the neighborhood in the downstream direction, of the device of which the selection is in progress.

Furthermore, in the case where, as the result of the categorization, the servers 5d to 5f are categorized into Type-1 or Type-2 (No in the operation St36), the server categorization unit 103 again performs the processing in the operation St33 as well. Also in this case, the server categorization unit 103 selects the device that is a node in the neighborhood, in the downstream direction, of the device of which the selection is in progress.

In this manner, the server categorization unit 103 searches the device on the route R5 in the downstream direction, until the Type-3 or Type-4 server 5e or 5f, or the destination terminal device 4 is detected. Then, the routing information generation unit 102 determines the address of Type-3 or Type-4 server 5e or 5f, or the destination device 4 that is first detected, as the destination address in the routing information. Moreover, the processing here is the same as that illustrated in FIG. 11, in terms of contents.

After the destination address in the routing information is determined (the operation St37), based on the route configuration information, the routing information generation unit 102 selects the device that is a node in the neighborhood in the upstream direction (in the direction of the transmission source), of the relay devices 2 or the servers 5d to 5f for which the routing information is generated (an operation St38).

Next, based on the route configuration information, the server categorization unit 103 determines whether or not the device of which the selection is in progress is the servers 5d to 5f (an operation St39). In the case where the device of which the selection is in progress is the servers 5d to 5f (Yes in the operation St39), the server categorization unit 103 categories the servers 5d to 5f based on the categorization table 13b (an operation St40).

Next, in the case where, as the result of the categorization, the servers 5d to 5f are categorized into Type-2 or Type-4 (Yes in the operation St41), the routing information generation unit 102 determines the addresses of the servers 5d to 5f as the source address in the routing information (an operation St42). Next, the routing information generation unit 102 generates the routing information based on the determined destination address and transmission address (an operation St43).

Furthermore, in the case where the selected device is not the servers 5d to 5f (No in the operation St39), the server categorization unit 103 determines whether or not the device of which the selection is in progress is the transmission source terminal device 3 (an operation St47). In a case where the device of which the selection is in progress is the transmission source terminal device 3 (Yes in the operation St47), the routing information generation unit 102 determines the address "A" of the transmission source terminal device 3 as the destination address in the routing information (an operation St48). Next, the routing information generation unit 102 generates the routing information based on the determined destination address and transmission address (an operation St43).

In a case where the device of which the selection is in progress is not the transmission source terminal device 3 (No in the operation St47), the server categorization unit 103 again performs the processing in the operation St38. In this case, the server categorization unit 103 selects the device that is a node in the neighborhood in the upstream direction, of the device of which the selection is in progress.

Furthermore, in a case where, as the result of the categorization, the servers 5d to 5f are categorized into Type-1 or Type-3 (No in the operation St41), the server categorization unit 103 again performs the processing in the operation St38 as well. Also in this case, the server categorization unit 103 selects the device that is a node in the neighborhood in the upstream direction, of the device of which the selection is in progress.

In this manner, the server categorization unit 103 searches the device on the route R5 in the upstream direction, until the Type-2 or Type-4 server 5d or 5f, or the transmission source terminal device 3 is detected. Then, the routing information generation unit 102 determines the address of Type-2 or Type-4 server 5d or 5f, or the destination device 4 that is first detected, as the source address in the routing information.

After the routing information is generated (the operation St43), if the relay devices 2 and the servers 5d to 5f for which the routing information is not generated are present (Yes in the operation St44), the routing information generation unit 102 again performs the processing in the operation St32. If the relay devices 2 and the servers 5d to 5f for which the routing information is not generated are not present (No in the operation St44), the routing information generation unit 102 ends the processing. In this manner, the processing that generates the routing information is performed.

Figure 16:
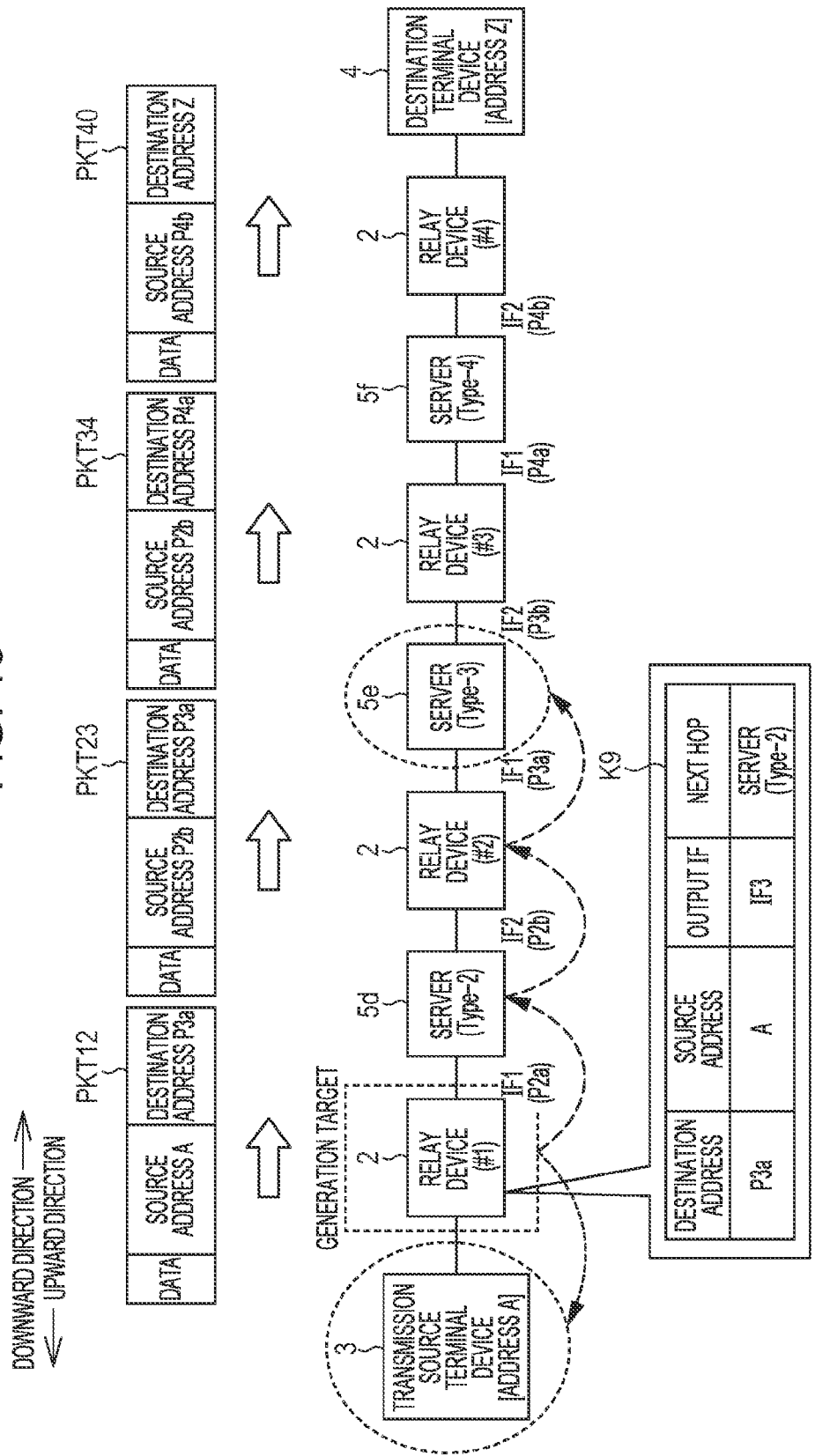
FIG. 16 is a diagram illustrating an example of generating the routing information according to the third embodiment.

In FIG. 16, an example of generating the routing information according to the present embodiment is illustrated. In FIG. 16, an example of generating the routing information for the relay device (#1) 2 is given. Moreover, in FIG. 16, an arrow indicates the order in which the network devices are selected by the server categorization unit 103 as the detection targets.

In the case where a target for which the routing information is generated is determined as the relay device (#1) 2, the server categorization unit 103 selects the server 5d that is a node in the neighborhood in the downstream direction, of the relay device (#1) 2 (refer to the operation St33). Because, as the result of the categorization (refer to the operation St35), the server 5d is neither Type-3 nor Type-4 (refer to No in the operation St36), the server categorization unit 103 selects the relay device (#2) 2 that is a node in the neighborhood in the downward, of the server 5d (refer to the operation St33).

Because neither the relay device (#2) 2 is neither the server (refer to No in the operation St34) nor the destination terminal device 4 (refer to No in the operation St45), the server categorization unit 103 selects the server 5e that is a node in the neighborhood in the downstream direction, of the relay device (#2) 2 (refer to the operation St33). Because the server 5e is categorized into Type-3 (refer to Yes in the operation St36), the routing information generation unit 102 determines the address "P3a" of the interface IF1 in the upstream direction (in the direction of the transmission source), of the server 5e, as the destination address in the routing information (refer to the operations St37).

Next, the routing information generation unit 102 selects the transmission source terminal device 3 that is a node in the neighborhood in the upstream direction, of the relay device (#1) 2 for which the routing information is generated (refer to the operation St38). For this reason, the routing information generation unit 102 determines the address "A" of the transmission source terminal device 3 as the source address in the routing information (refer to an operation St48). The routing information generation unit 102 generates routing information K9 based on the destination address "P3a" and the source address "A" that are determined (refer to the operation St43). Moreover, the "output interface" and the "NEXT HOP" in the routing information K9 indicate "IF3" and "server (Type-2)", respectively.

Figure 17:
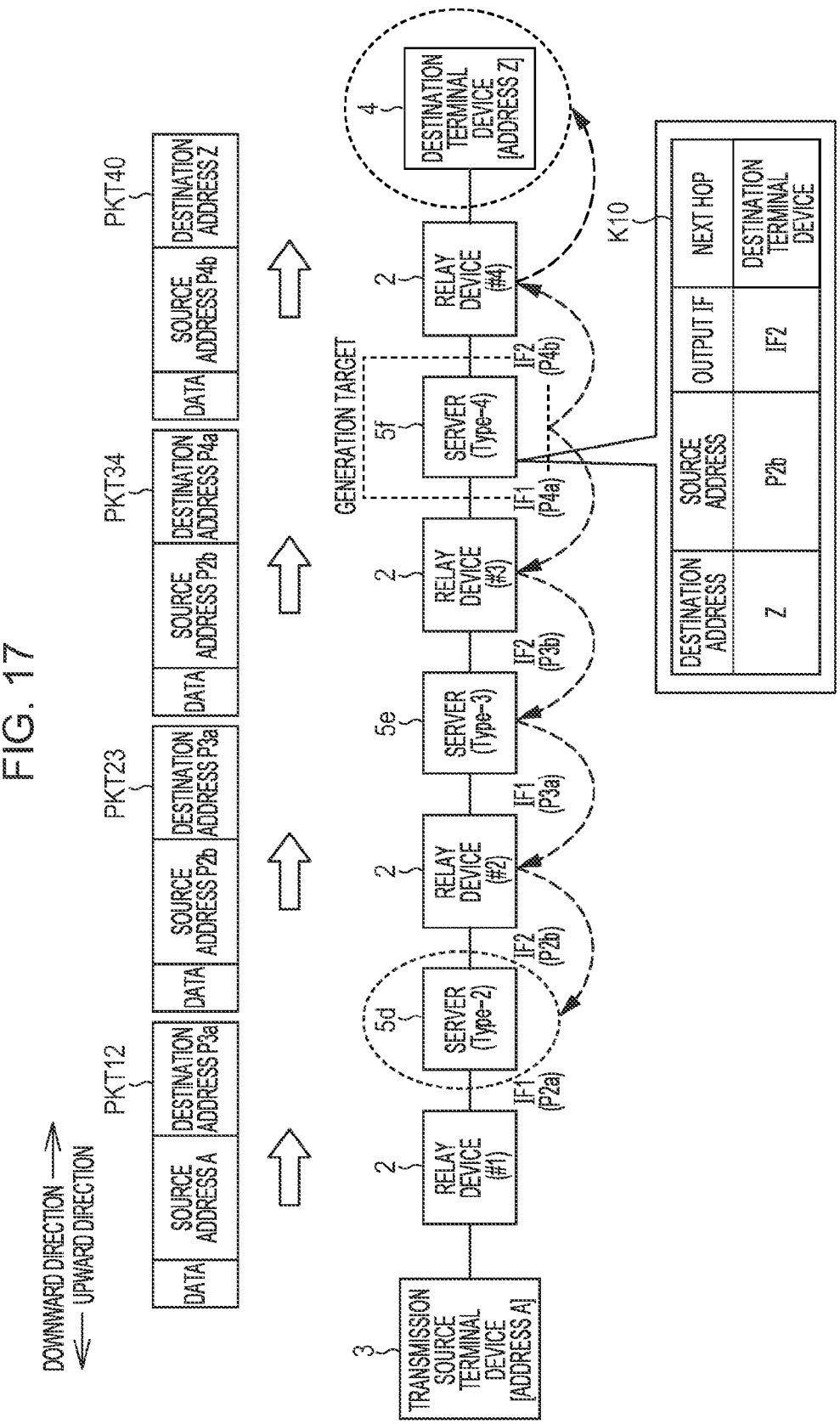
FIG. 17 is a diagram illustrating another example of generating the routing information according to the third embodiment.

In FIG. 17, another example of generating the routing information according to the present embodiment is illustrated. In FIG. 17, an example of generating the routing information for the server 5f is given. Moreover, in FIG. 17, an arrow indicates the order in which the network devices are selected by the server categorization unit 103 as detection targets.

In the case where the target for which the routing information is generated is determined as the server 5f, the server categorization unit 103 selects the relay device (#4) 2 that is a node in the neighborhood in the downstream direction, of the server 5f (refer to the operation St33). Because the relay device (#4) 2 is neither the server (refer to No in the operation St34), nor the destination terminal device 4 (refer to No in the operation St45), the server categorization unit 103 selects the destination terminal device 4 that is a node in the neighborhood in the downstream direction, of the relay device (#4) 2 (refer to the operation St33). For this reason, the routing information generation unit 102 determines the address "Z" of the destination address terminal device 4 as the destination address in the routing information (refer to an operation St46).

Next, the routing information generation unit 102 selects the relay device (#3) 2 that is a node in the neighborhood in the upstream direction, of the server 5f for which the routing information is generated (refer to the operation St38).

Because neither the relay device (#3) 2 is neither the server (refer to No in the operation St39) nor the transmission source terminal device 3 (refer to No in the operation St47), the server categorization unit 103 selects the server 5e that is a node in the neighborhood in the upstream direction, of the relay device (#3) 2 (refer to the operation St38). Because the server 5e is categorized into Type-3 (refer to No in the operation St41), the routing information generation unit 102 selects the relay device (#2) 2 that is a node in the neighborhood in the downward, of the server 5e (refer to the operation St38).

Because neither the relay device (#2) 2 is neither the server (refer to No in the operation St39) nor the transmission source terminal device 3 (refer to No in the operation St47), the server categorization unit 103 selects the server 5d that is a node in the neighborhood in the upstream direction, of the relay device (#3) 2 (refer to the operation St38). Because the server 5d is categorized into Type-2 (refer to Yes in the operation St41), the routing information generation unit 102 determines the address "P2b" of the interface IF2 in the downstream direction (in the direction of the destination), of the server 5d, as the destination address in the routing information (refer to the operations St42).

The routing information generation unit 102 generates routing information K10 based on the destination address "Z" and the source address "P2b" that are determined (refer to the operation St43). Moreover, the "output interface" and the "NEXT HOP" in the routing information K10 indicate "IF2" and "destination terminal device", respectively.

In this manner, the server categorization unit 103 sequentially selects the detection target network devices in such a manner that the packet route starting from the relay devices 2 or the servers 5d to 5f for which the routing information is generated leads to the destination (the destination terminal device 4) of the packet. The routing information generation unit 102 generates the routing information based on the destination address indicating Type-3 or Type-4 server 5e or 5f, or the destination terminal device 4 that is first detected by the server categorization unit 103.

Additionally, the server categorization unit 103 sequentially selects the detection target network devices in such a manner that the packet route starting from the relay devices 2 or the servers 5d to 5f for which the routing information is generated leads to the transmission source (the transmission source terminal device 3) of the packet. The routing information generation unit 102 generates the routing information based on the destination source address indicating Type-2 or Type-4 server 5d or 5f, or the transmission source terminal device 3 that is first detected by the server categorization unit 103.

According to the present embodiment, the routing information for the individual relay devices 2 or the individual servers 5d to 5f can be easily generated based on the result of the detection of the node (refer to FIG. 10) of which the destination address and the source address are changed.

Fourth Embodiment

However, according to the third embodiment, because as many as the relay devices 2 and the serves 5d to 5f on the route R5 is searched among the network devices on the route R5, the greater the number of devices, the more time it takes to generate the routing information. Then, as in a technique described below, with the one-at-a-time search of the network devices on the route R5 in the upstream direction and in the downstream direction, the time it takes to perform the generation processing may be shortened by generating the routing information for the each of the relay devices 2 and each of the servers 5d to 5f on the route R5.

According to the present embodiment, the network management server 1 determines the destination address with the same technique as that employed according to the second embodiment, and determines the source address with a technique similar to that employed according to the second embodiment. Moreover, according to the present embodiment, it is also assumed that the routing information for each of the relay devices 2 and each of the servers 5d to 5f on the route R5 is generated to configure the route R5 on the network NW illustrated in FIGS. 9 and 10.

Figure 18A:
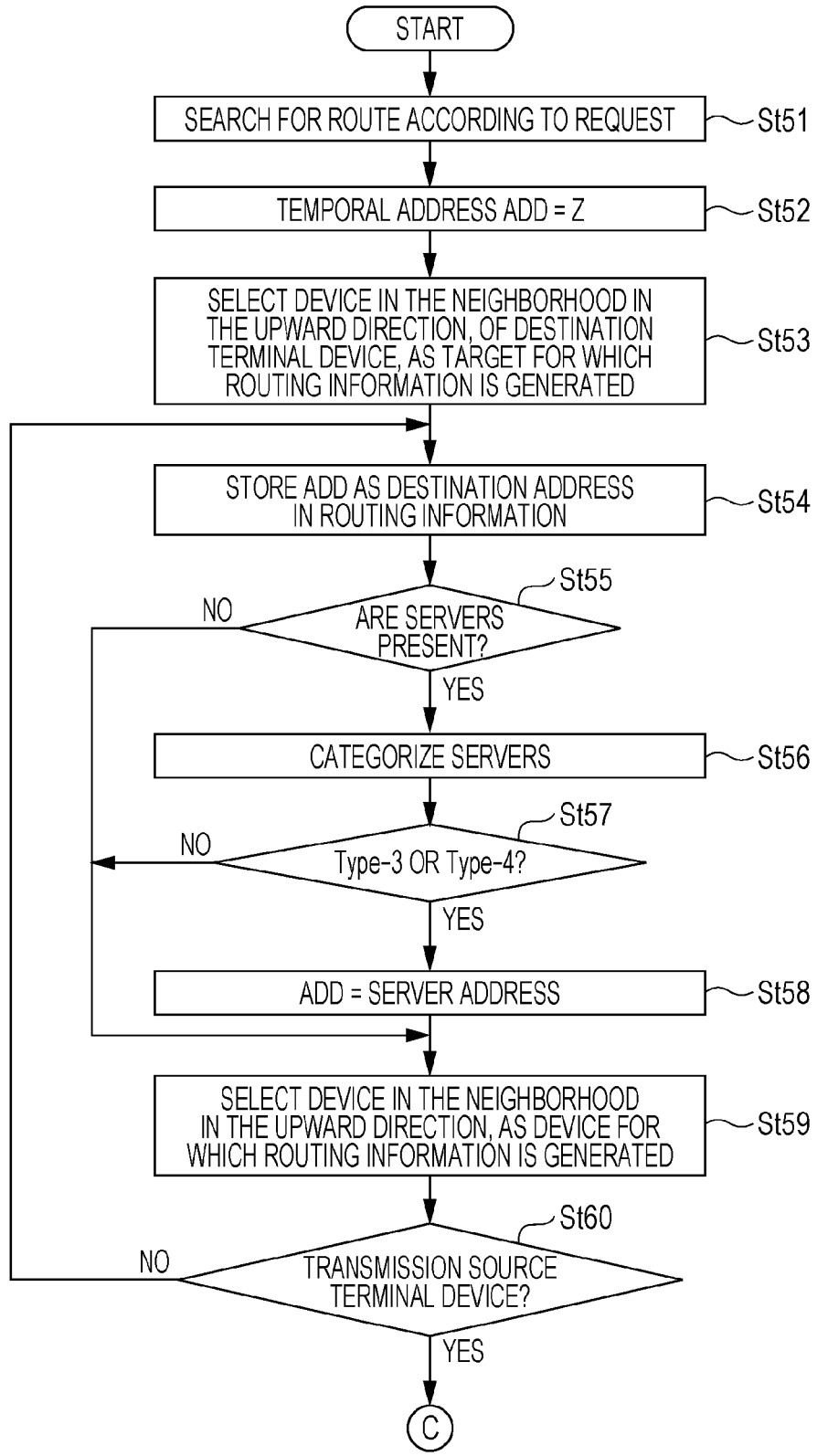
FIGS. 18A and 18B are flowcharts illustrating processing that generates the routing information according to a fourth embodiment.
Figure 18B:
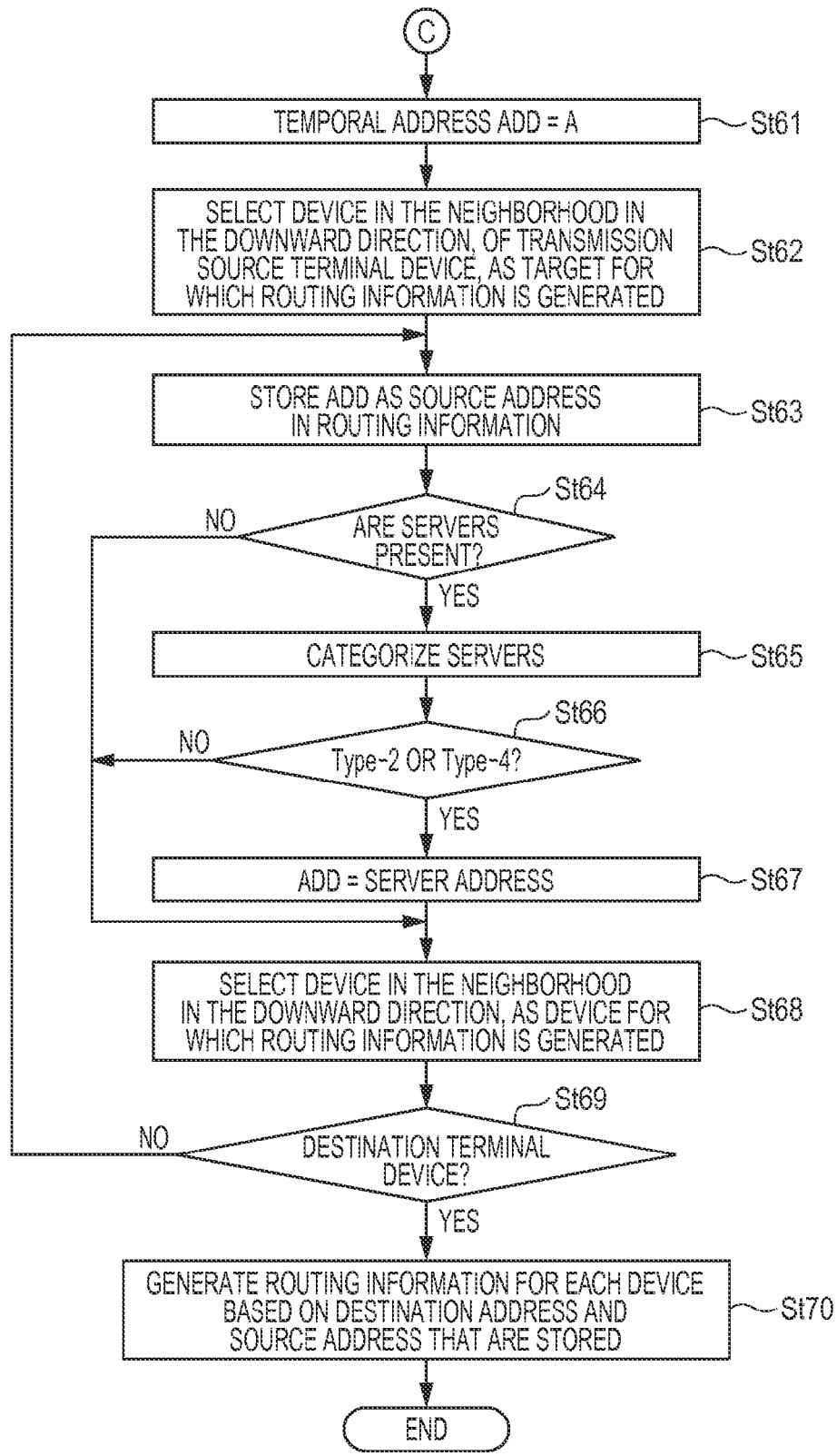

FIGS. 18A and 18B are flowcharts illustrating processing that generates the routing information according to the fourth embodiment. First, the route search unit 101 searches for the route according to a request (an operation St51). Accordingly, the route R5 on which the indicated servers 5d to 5f are present is searched for.

Next, the routing information generation unit 102 sets the address "Z" of the destination terminal device 4 to be a temporary address ADD corresponding to the destination address in the routing information (an operation St52). The temporary address ADD, for example, is temporarily stored in a storage unit, for example, such as the HDD 13.

Next, based on the route configuration information, the routing information generation unit 102 selects a device that is a node in the neighborhood in the upstream direction (in the direction of the transmission source), of the destination terminal device 4, as a target for which the routing information is generated (an operation St53). That is, the routing information generation unit 102 selects the relay device (#4) 2.

Next, the routing information generation unit 102 determines the temporary ADD as the destination address in the routing information for the device of which the selection is in progress, and stores the resulting destination address in the storage unit, for example, such as the HDD 13 (an operation St54). Next, based on the route configuration information, the server categorization unit 103 determines whether or not the device of which the selection is in progress is the servers 5$d$ to 5$f$ (an operation St55).

In the case where the device of which the selection is in progress is not the servers 5$d$ to 5$f$ (No in the operation St55), based on the route configuration information, the routing information generation unit 102 selects a device that is a node in the neighborhood in the upstream direction, of the device of which the selection is in progress, as the target for which the routing information is generated (an operation St59). For example, in a case where the device of which the selection is in progress is the relay device (#4) 2, the routing information generation unit 102 selects the server 5$f$ in the neighborhood of the relay device (#4) 2.

Next, the server categorization unit 103 determines whether or not the device of which the selection is in progress is the transmission source terminal device 3 (an operation St60). In the case where the device of which the selection is in progress is not the transmission source terminal device 3 (No in the operation St60), to be more precise, in a case where the device of which the selection is in progress is the relay devices 2, the routing information generation unit 102 again performs the processing in the operation St54.

In the case where the device of which the selection is in progress is the servers 5$d$ to 5$f$ (Yes in the operation St55), the server categorization unit 103 categorizes the servers 5$d$ to 5$f$ based on the categorization table 13$b$ (an operation St56). Next, in the case where, as the result of the categorization, the servers 5$d$ to 5$f$ are categorized into Type-3 or Type-4 (Yes in the operation St57), the routing information generation unit 102 sets addresses of the servers 5$d$ to 5$f$ to be the temporary address ADD (an operation St58). That is, the routing information generation unit 102 writes the temporary address ADD in storage to the addresses of the servers 5$d$ to 5$f$. Thereafter, in the operation St59, the next-neighboring device is selected.

Furthermore, also in the case where, as the result of the categorization, the servers 5$d$ to 5$f$ are categorized into Type-1 or Type-2 (No in the operation St57), the next-neighboring device is selected in the operation St59.

Furthermore, in a case where the device that is selected in the operation St59 is the transmission source device 3 (Yes in the operation St60), because the search of all the devices on the route R5 in the upstream direction is ended, the routing information generation unit 102 next searches all the devices on the route R5 in the downlink direction. Moreover, the processing here is the same as that illustrated in FIG. 13, in terms of contents.

Next, the routing information generation unit 102 sets the address "A" of the transmission source terminal device 3 to be the temporary address ADD corresponding to the source address in the routing information (an operation St61).

Next, based on the route configuration information, the routing information generation unit 102 selects a device that is a node in the neighborhood in the down direction (in the direction of the destination), of the transmission source terminal device 3, as the target for which the routing information is generated (an operation St62). That is, the routing information generation unit 102 selects the relay device (#1) 2.

Next, the routing information generation unit 102 determines the temporary ADD as the source address in the routing information for the device of which the selection is in progress, and stores the resulting source address in the storage unit, for example, such as the HDD 13 (an operation St63). Next, based on the route configuration information, the server categorization unit 103 determines whether or not the device of which the selection is in progress is the servers 5$d$ to 5$f$ (an operation St64).

In the case where the device of which the selection is in progress is not the servers 5$d$ to 5$f$ (No in the operation St64), based on the route configuration information, the routing information generation unit 102 selects a device that is a node in the neighborhood in the downstream direction, of the device of which the selection is in progress, as the target for which the routing information is generated (an operation St68). For example, in the case where the device of which the selection is in progress is the relay device (#1) 2, the routing information generation unit 102 selects the server 5$d$ in the neighborhood of the relay device (#1) 2.

Next, the server categorization unit 103 determines whether or not the device of which the selection is in progress is the destination terminal device 4 (an operation St69). In the case where the device of which the selection is in progress is not the destination terminal device 4 (No in the operation St69), to be more precise, in a case where the device of which the selection is progress is the relay devices 2, the routing information generation unit 102 again performs the processing in the operation St63.

In the case where the device of which the selection is in progress is the servers 5$d$ to 5$f$ (Yes in the operation St64), the server categorization unit 103 categorizes the servers 5$d$ to 5$f$ based on the categorization table 13$b$ (an operation St65). Next, in the case where, as the result of the categorization, the servers 5$d$ to 5$f$ are categorized into Type-2 or Type-4 (Yes in the operation St66), the routing information generation unit 102 sets addresses of the servers 5$d$ to 5$f$ to be the temporary address ADD (an operation St67). That is, the routing information generation unit 102 writes the temporary address ADD in storage to the addresses of the servers 5$d$ to 5$f$. Thereafter, in the operation St68, the next-neighboring device is selected.

Furthermore, also in the case where, as the result of the categorization, the servers 5$d$ to 5$f$ are categorized into Type-1 or Type-3 (No in the operation St66), the next-neighboring device is selected in the operation St68.

Furthermore, in a case where the device selected in the operation St68 is the destination terminal device 4 (Yes in the operation St69), because all the devices on the route R5 in the downstream direction is ended, the routing information for each of the device is generated based on the destination address and the source address that are stored (an operation St70). In this manner, the processing that generates the routing information is performed.

Figure 19:
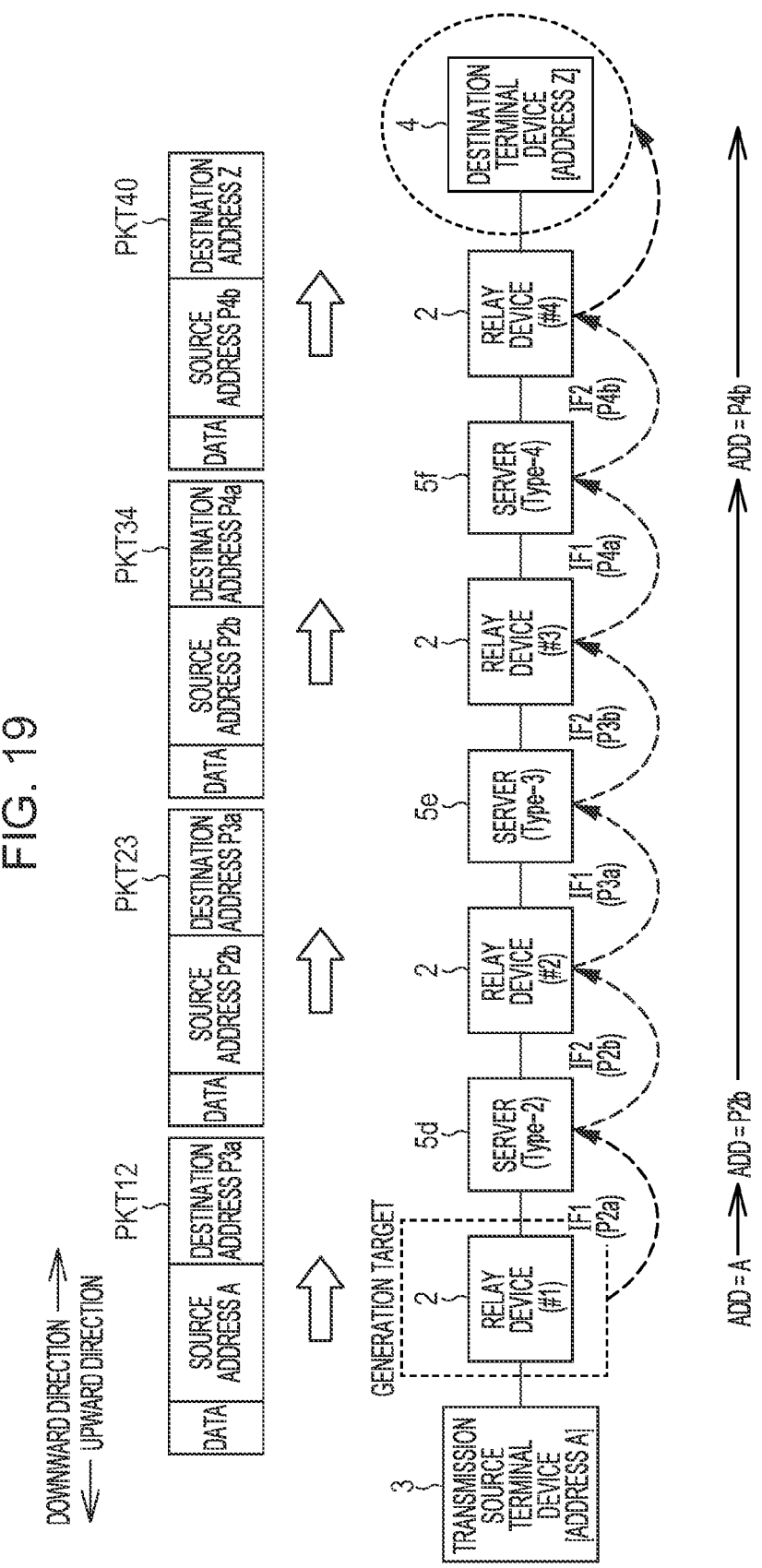
FIG. 19 is a diagram illustrating an example of generating the routing information according to the fourth embodiment.

In FIG. 19, an example of generating the routing information according to the present embodiment is illustrated. A technique of determining the destination address in the routing information according to the present embodiment is the same as that employed according to the second embodiment. Because the example of generating the routing information using the technique is described above referring to FIG. 14, FIG. 19 illustrates only a technique of determining the source address in the routing information. Moreover, in FIG. 19, a dotted-line arrow indicates the order in which the network devices are selected by the routing information generation unit 102 as targets for which the routing information is generated, and a solid line arrow ADD indicates a change in a value of the temporary address described below.

First, the routing information generation unit 102 sets the address "A" of the transmission source terminal device 3 to be the temporary address ADD (refer to the operation St61), and selects the relay device (#1) 2 as the target for which the routing information is generated (refer to the operation St62). The routing information generation unit 102 stores the temporary address ADD="A" as the source address in the routing information for the relay device (#1) 2 (refer to the operation St63).

Next, the routing information generation unit 102 selects the server 5*d* that is a node in the neighborhood in the downstream direction, of the relay device (#1) 2, as the target for which the routing information is generated (refer to the operation St68). The routing information generation unit 102 stores the temporary address ADD="A" as the source address in the routing information for the server 5*d* (refer to the operation St63).

Because the server 5*d* is categorized by the server categorization unit 103 into Type-2 (refer to Yes in the operation St66), the routing information generation unit 102 sets the address "P2*b*" of the server 5*d* of which the selection is in progress to be the temporary address ADD (refer to the operation St67). At this time, the routing information generation unit 102 sets the address "P2*b*" of the interface IF2 in the downstream direction (in the direction of the destination), of the server 5*d*, to be the temporary ADD. In the case where the address of the server 5*d* is only one without being provided to each of the interfaces IF1 and IF2, the address of the server 5*d* is set to be the temporary address ADD.

Next, the routing information generation unit 102 selects the relay device (#2) 2 that is a node in the neighborhood in the downstream direction, of the server 5*d*, as the target for which the routing information is generated (refer to the operation St68). The routing information generation unit 102 stores the temporary address ADD="P2*b*" as the source address in the routing information for the relay device (#2) 2 (refer to the operation St63).

Next, the routing information generation unit 102 selects the server 5*e* that is a node in the neighborhood in the downstream direction, of the relay device (#2) 2, as the target for which the routing information is generated (refer to the operation St68). The routing information generation unit 102 stores the temporary address ADD="P2*b*" as the source address in the routing information for the server 5*e* (refer to the operation St63).

Because the server 5*e* of which the selection is in progress is categorized by the server categorization unit 103 into Type-3 (refer to No's in the operations St64, St65, and St66), the routing information generation unit 102 does not change the temporary address ADD.

Next, the routing information generation unit 102 selects the relay device (#3) 2 that is a node in the neighborhood in the downstream direction, of the server 5*e*, as the target for which the routing information is generated (refer to the operation St68). The routing information generation unit 102 stores the temporary address ADD="P2*b*" as the source address in the routing information for the relay device (#3) 2 (refer to the operation St63).

Next, the routing information generation unit 102 selects the server 5*f* that is a node in the neighborhood in the downstream direction, of the relay device (#3) 2, as the target for which the routing information is generated (refer to the operation St68). The routing information generation unit 102 stores the temporary address ADD="P2*b*" as the source address in the routing information for the server 5*f* (refer to the operation St63).

Because the server 5*f* is categorized by the server categorization unit 103 into Type-4 (refer to Yes in the operation St66), the routing information generation unit 102 sets the address "P4*b*" of the server 5*f* of which the selection is in progress to be the temporary address ADD (refer to the operation St67). At this time, the routing information generation unit 102 sets the address "P4*b*" of the interface IF2 in the downstream direction (in the direction of the destination), of the server 5*d*, to be the temporary ADD. In the case where the address of the server 5*f* is only one without being provided to each of the interfaces IF1 and IF2, the address of the server 5*f* is set to be the temporary address ADD.

Next, the routing information generation unit 102 selects the relay device (#4) 2 that is a node in the neighborhood in the downstream direction, of the server 5*f*, as the target for which the routing information is generated (refer to the operation St68). The routing information generation unit 102 stores the temporary address ADD="P4*b*" as the source address in the routing information for the relay device (#4) 2 (refer to the operation St63).

Next, the routing information generation unit 102 selects the destination terminal device 4 that is a node in the neighborhood in the downstream direction, of the relay device (#4) 2. However, because the destination terminal device 4 is not the target for which the routing information is generated, the routing information generation unit 102 ends the search and generates the routing information for each of the devices based on the destination address and the source address that are stored (refer to the operation St70). Moreover, the technique of determining the destination address is as is described referring to FIG. 14.

In this manner, the routing information generation unit 102 sequentially selects the network device for which the routing information is generated, in such a manner that the packet route R5 starting from the destination terminal device 4 leads to the transmission source terminal device 3. When a network device for which the routing information is generated is categorized into Type-3 or Type-4, the routing information generation unit 102 generates the routing information for a network device for which the routing information is generated, which is selected after the Type-3- or Type-4-categorized network device, based on the destination address indicating the Type-3- or Type-4-categorized network device.

Additionally, the routing information generation unit 102 sequentially the network device for which the routing information is generated, in such a manner that the packet route R5 starting from the transmission source terminal device 3 leads to the destination terminal device 4. When a network device for which the routing information is generated is categorized into Type-2 or Type-4, the routing information generation unit 102 generates the routing information for a network device for which the routing information is generated, which is selected after the Type-2- or Type-4-categorized network device, based on the source address indicating the Type-2- or Type-4-categorized network device.

According to the present embodiment, because, with the one-at-a-time search of the network devices on the route R5 in the upstream direction and in the downstream direction, the routing information for each of the relay devices 2 and each of the servers 5*d* to 5*f* on the route R5 can be generated, the time it takes to perform the generation processing can be shortened.

As described so far, the route setting device (the network management server) 1 according to the embodiments sets the routing information indicating the transmission source of the signal for each of the multiple network devices on the route over which the packet including the destination information (the destination address) indicating the destination and the transmission source information (the source address) indicating the transmission source is transferred, based on at least one of the destination address and the transmission source information. The route setting device 1 has a categorization unit (the server categorization unit) 103, and a generation unit (the routing information generation unit) 102.

Among the multiple networks devices (the relay devices 2 and the servers 5*d* to 5*f*), the categorization unit 103 detects the network devices (servers 5*d* to 5*f*) that change at last one of the destination information and the transmission source information on the signal that passes through the network devices (servers 5*d* to 5*f*), and categorizes the network devices by a type of the information that is changed. The generation unit 102 generates the routing information according to the result of the categorization by the categorization unit 103.

With the configuration described above, among the network devices on the signal route, the network devices that change at least one of the destination information and the transmission source information on the signal are categorized by the type of the information that is changed. The routing information is generated according to the result of the categorization of the network device. For this reason, even though at least one of the destination information and the transmission source information on the signal is changed by a specific network device, the routing information is generated in such a manner that the routing information is consistent with the destination information or the transmission source information that is changed.

Therefore, with the route setting device 1 according to the embodiment, the suitable routing information can be set to the network device on the signal route.

Furthermore, a route setting method according to the embodiment is one in which the routing information indicating the transmission destination of the signal is set to each of the plurality of network devices on the route over which the packet including the destination information (the destination address) indicating the destination and the transmission source information (the source address) indicating the transmission source is transferred as the signal. The method of setting the route includes the following procedures.

A procedure (1): Among the network devices (the relay devices 2, and the relay devices 5*d* to 5*f*) the network device is detected that changes at least one of the destination information and the transmission source information on the signal that passes through the network device.

A procedure (2): The network devices are categorized by the type of the information that is changed.

A procedure (3): The routing information is generated according to the result of the categorization.

The route setting method according to the embodiment includes the same configuration as the route setting device described above and thus accomplishes an operational effect of which contents is the same as those described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A route setting device comprising:
a storage in which routing information is stored; and
a processor configured to execute a procedure, the procedure comprising:
selecting a network device among a plurality of network devices forming a network over which a signal including transmission source information and destination information is transmitted, the network device changing at least one of the transmission source information and the destination information included in the signal;
categorizing the network device based on a type of the changed information; and
generating the routing information according to a result of the categorizing,
wherein the route setting device sets the generated routing information to the network device.

2. The route setting device according to claim 1,
wherein the selected network device is categorized into one of a first category network device changing the transmission source information, a second category network device changing the destination information, and a third category network device changing the transmission source information and the destination information.

3. The route setting device according to claim 2,
wherein the network device is sequentially selected from among the plurality of network devices in such a manner that starting from the network device for which the routing information is generated leading to the destination of the signal on a route of the signal, and
wherein the routing information is generated based on the destination information indicating the second category network device or the third category network device that is first selected.

4. The route setting device according to claim 3,
wherein the network device is sequentially selected from among the plurality of network devices in such a manner that signal starting from the network device for which the routing information is generated leading to the transmission source of the signal on the route of the signal, and
wherein the routing information is generated based on the transmission source information indicating the first category network device or the third category network device that is first selected.

5. The route setting device according to claim 2,
wherein a first network device is sequentially selected from among the plurality of network devices in such a manner that starting from the destination of the signal leading to the transmission source of the signal on the route of the signal, and
wherein, when the first network device is categorized into the second category network device or the third category network device, the routing information is generated for a second network device selected after the first network device, based on the destination information indicating the first network device.

6. The route setting device according to claim 5,
wherein the first network device is sequentially selected from among the plurality of network devices in such a manner that starting from the transmission source of the signal leading to the destination of the signal on the route of the signal, and wherein, when the first network device is categorized into the first category network device or the third category network device, the routing information is generated for the second network device selected after the first network device, based on the transmission source information indicating the first network device.

7. A route setting method comprising:
selecting a network device among a plurality of network devices forming a network over which a signal including transmission source information and destination information is transmitted, the network device changing at least one of the transmission source information and the destination information included in the signal;
categorizing the network device based on a type of the changed information; and
generating routing information according to a result of the categorizing,
wherein the route setting device sets the generated routing information to the network device.

8. The route setting method according to claim 7,
wherein the selected network device is categorized into one of a first category network device changing the transmission source information, a second category network device changing the destination information, and a third category network device changing the transmission source information and the destination information.

9. The route setting method according to claim 8,
wherein the network device is sequentially selected from among the plurality of network devices in such a manner that starting from the network device for which the routing information is generated leading to the destination of the signal on a route of the signal, and
wherein the routing information is generated based on the destination information indicating the second category network device or the third category network device that is first selected.

10. The route setting method according to claim 9,
wherein the network device is sequentially selected from among the plurality of network devices in such a manner that signal starting from the network device for which the routing information is generated leading to the transmission source of the signal on the route of the signal, and
wherein the routing information is generated based on the transmission source information indicating the first category network device or the third category network device that is first selected.

11. The route setting method according to claim 8,
wherein a first network device is sequentially selected from among the plurality of network devices in such a manner that starting from the destination of the signal leading to the transmission source of the signal on the route of the signal, and
wherein, when the first network device is categorized into the second category network device or the third category network device, the routing information is generated for a second network device selected after the first network device, based on the destination information indicating the first network device.

12. The route setting method according to claim 11,
wherein the first network device is sequentially selected from among the plurality of network devices in such a manner that starting from the transmission source of the signal leading to the destination of the signal on the route of the signal, and
wherein, when the first network device is categorized into the first category network device or the third category network device, the routing information is generated for the second network device selected after the first network device, based on the transmission source information indicating the first network device.

* * * * *